US012718735B2

(12) United States Patent
Kwon et al.

(10) Patent No.: US 12,718,735 B2
(45) Date of Patent: Aug. 25, 2026

(54) DISPLAY DRIVING CIRCUIT AND DRIVING METHOD THEREOF

(71) Applicant: SAMSUNG ELECTRONICS CO., LTD., Suwon-si (KR)

(72) Inventors: Taek Su Kwon, Suwon-si (KR); In-Suk Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/036,579

(22) Filed: Jan. 24, 2025

(65) Prior Publication Data

US 2026/0024480 A1 Jan. 22, 2026

(30) Foreign Application Priority Data

Jul. 22, 2024 (KR) ........................ 10-2024-0096607

(51) Int. Cl.
*G09G 3/20* (2006.01)
*G09G 3/3275* (2016.01)
(Continued)

(52) U.S. Cl.
CPC ............ *G09G 3/2092* (2013.01); *G09G 3/20* (2013.01); *G09G 3/3275* (2013.01); *G09G 3/3291* (2013.01); *G09G 3/3685* (2013.01); *G09G 3/3688* (2013.01); *G09G 3/3696* (2013.01); *G09G 2310/027* (2013.01); *G09G 2310/0291* (2013.01); *G09G 2310/08* (2013.01); *G09G 2320/0233* (2013.01); *G09G 2320/0271* (2013.01); *G09G 2330/021* (2013.01); *G09G 2330/028* (2013.01)

(58) Field of Classification Search
CPC ..... G09G 2320/0673; G09G 2310/027; G09G 2320/0276; G09G 3/3233; G09G 2330/028; G09G 3/3696; G09G 3/20; G09G 2370/08; G09G 2320/0233; G09G 2310/0291; G09G 2310/08; G09G 2330/021; G09G 3/3291; G09G 3/3275; G09G 3/3688; G09G 2310/0275
See application file for complete search history.

(56) References Cited

U.S. PATENT DOCUMENTS 7,158,108 B2 1/2007 Hagino
7,317,442 B2 1/2008 Nakai et al.
(Continued)

FOREIGN PATENT DOCUMENTS

KR 10 1084172 B1 11/2011

*Primary Examiner* — Dismery Mercedes
(74) *Attorney, Agent, or Firm* — Sughrue Mion, PLLC

(57) ABSTRACT

Provided is a display driving circuit, including at least one processor configured to generate a first gamma code corresponding to a first mode among a plurality of modes, a gamma voltage generator configured to generate a plurality of gamma voltages with respect to the first mode, a data driver configured to generate data signal corresponding to the first gamma code based on the first gamma code and the plurality of gamma voltages, and generate a first level data corresponding to a minimum gamma voltage among the plurality of gamma voltages based on the data signal, and a gamma control logic circuit configured to generate a gamma voltage control signal for controlling the gamma voltage generator based on the first level data.

20 Claims, 14 Drawing Sheets

(51) Int. Cl.
*G09G 3/3291* (2016.01)
*G09G 3/36* (2006.01)

(56) References Cited

U.S. PATENT DOCUMENTS

| | | | | | |
|---|---|---|---|---|---|
| 7,737,932 | B2 | 6/2010 | Kato | | |
| 9,837,040 | B2 | 12/2017 | Moon et al. | | |
| 11,776,484 | B2 | 10/2023 | Lim et al. | | |
| 2005/0270263 | A1 | 12/2005 | Kim et al. | | |
| 2010/0001984 | A1* | 1/2010 | Kim | G09G 3/3696 | 345/212 |
| 2010/0134530 | A1* | 6/2010 | Lee | G09G 3/3688 | 345/88 |
| 2011/0181577 | A1 | 7/2011 | Shira | | |
| 2014/0118228 | A1* | 5/2014 | Kang | G09G 3/3233 | 345/77 |
| 2016/0035321 | A1* | 2/2016 | Cho | G09G 3/2092 | 345/213 |
| 2017/0076656 | A1* | 3/2017 | Bang | G09G 3/2092 | |
| 2017/0249005 | A1* | 8/2017 | Hwang | G06F 1/3265 | |
| 2017/0309219 | A1* | 10/2017 | Kong | G09G 3/2003 | |
| 2018/0151155 | A1* | 5/2018 | Chen | G06F 3/1438 | |
| 2020/0286448 | A1* | 9/2020 | Kim | G09G 5/18 | |
| 2022/0148521 | A1* | 5/2022 | Kim | G09G 3/3291 | |
| 2023/0300284 | A1* | 9/2023 | Ma | H04N 5/202 | 348/254 |
| 2023/0316983 | A1* | 10/2023 | Lo | G09G 3/2092 | |
| 2025/0022426 | A1* | 1/2025 | Oh | G09G 3/3275 | |

* cited by examiner

DISPLAY DRIVING CIRCUIT AND DRIVING METHOD THEREOF

CROSS-REFERENCE TO RELATED APPLICATION

This application claims priority to Korean Patent Application No. 10-2024-0096607 filed in the Korean Intellectual Property Office on Jul. 22, 2024, the entire contents of which is incorporated herein by reference.

BACKGROUND

Embodiments of the present disclosure relate to a display driving circuit and a driving method of a display driving circuit.

Typically, a display panel displays images to provide users with a variety of visual information. A display panel may include a plurality of pixels. A display driver integrated circuit (DDI) is used to drive the pixels. In particular, a gamma voltage generator of the display driving circuit may apply an analog gamma voltage to the pixel to output light of a preset luminance. The electrical power consumed by the gamma voltage generator occupies a substantial portion in the power consumption of the display device. In order to drive the display panel at a relatively low power, the electrical power consumed by the gamma voltage generator needs to be decreased.

SUMMARY

One or more embodiments provide a display device and a driving method of a display device that includes gamma voltage generator with low power consumption.

According to an aspect of one or more embodiments, there is provided a display driving circuit, including at least one processor configured to generate a first gamma code corresponding to a first mode among a plurality of modes, a gamma voltage generator configured to generate a plurality of gamma voltages with respect to the first mode, a data driver configured to generate data signal corresponding to the first gamma code based on the first gamma code and the plurality of gamma voltages, and generate a first level data corresponding to a minimum gamma voltage among the plurality of gamma voltages based on the data signal, and a gamma control logic circuit configured to generate a gamma voltage control signal for controlling the gamma voltage generator based on the first level data.

According to another aspect of one or more embodiments, there is provided a driving method of a display driving circuit, including generating a first gamma code corresponding to a first mode among a plurality of modes, generating, by a gamma voltage generator, a plurality of gamma voltages corresponding to the first mode, generating, by a data driver, a data signal corresponding to the first gamma code based on the first gamma code and the plurality of gamma voltages, and generating a first level data corresponding to a minimum gamma voltage among the plurality of gamma voltages based on the data signal, and generating a gamma voltage control signal for controlling the gamma voltage generator based on the first level data.

According to still another aspect of one or more embodiments, there is provided a display driving circuit, including at least one processor configured to generate a first gamma code corresponding to a first mode among a plurality of modes, in a first section among a porch section, the porch section being an interval between adjacent display periods among a plurality of display periods in which a data signal is output, a gamma voltage generator configured to generate a plurality of gamma voltages with respect to the first mode, a data driver configured to generate the data signal corresponding to the first gamma code based on the first gamma code and the plurality of gamma voltages in the first section, and generate a first level data indicating a minimum gamma voltage among the plurality of gamma voltages based on the data signal, and a gamma control logic circuit configured to generate a gamma voltage control signal for controlling the gamma voltage generator based on the first level data in a second section after the first section during the porch section.

BRIEF DESCRIPTION OF DRAWINGS

Embodiments will be more clearly understood from the following detailed description taken in conjunction with the accompanying drawings in which.

DETAILED DESCRIPTION

Figure 1:
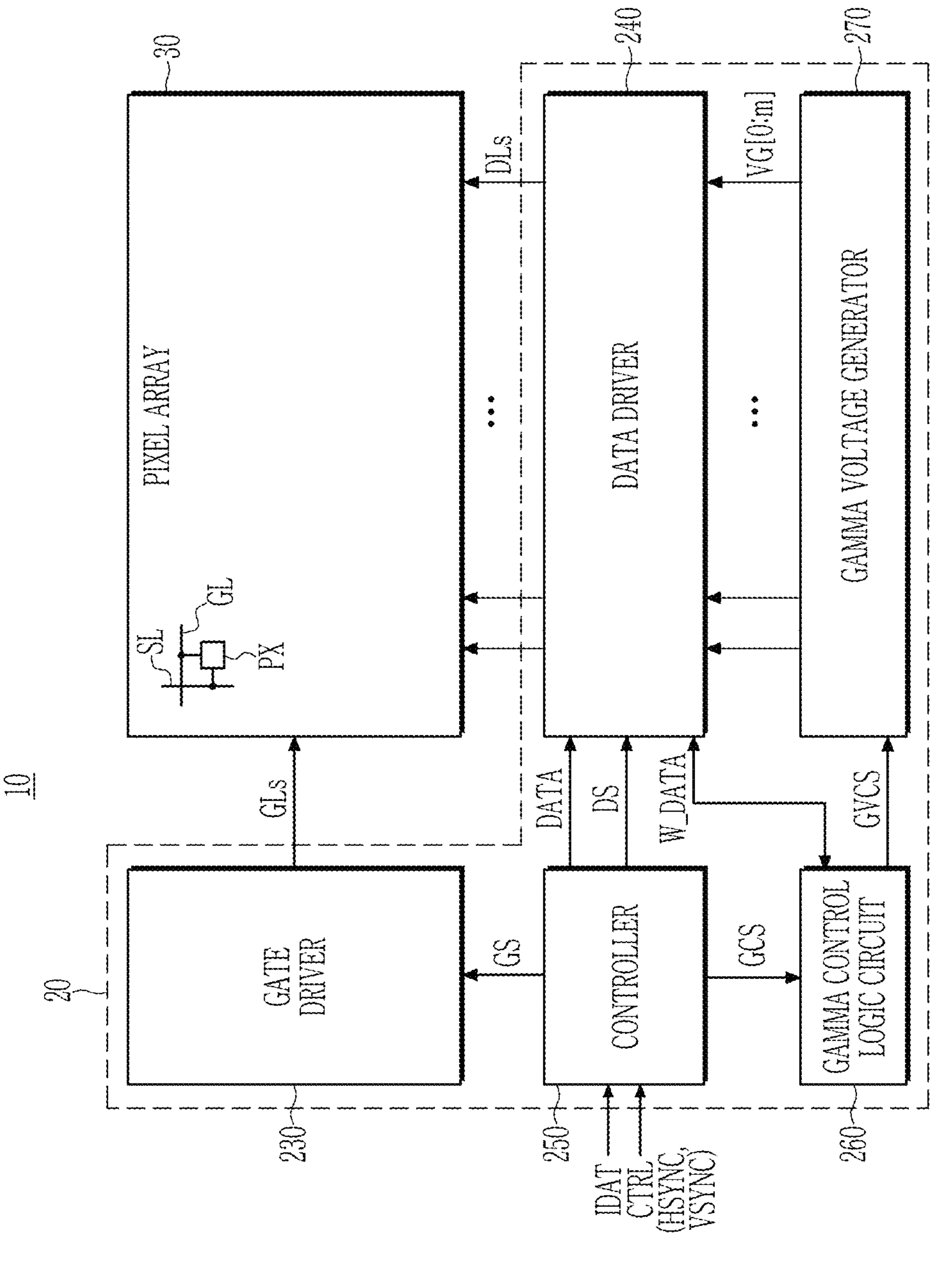
FIG. 1 is a block diagram of a display device according to one or more embodiments.

Hereinafter, embodiments are described in detail with reference to the accompanying drawings. The same reference numerals denote the same elements in the drawings, and redundant descriptions on the same elements are omitted.

Embodiments described herein are example embodiments, and thus, the disclosure is not limited thereto.

Accordingly, the drawings and description are to be regarded as illustrative in nature and not restrictive. Like reference numerals designate like elements throughout the specification. In the flowchart described with reference to the drawings, the operation order may be changed, several operations may be merged, certain operations may be divided, and particular operations may not be performed.

In addition, expressions written in the singular may be construed in the singular or plural unless an explicit expression such as "one" or "single" is used. Terms including ordinal numbers such as first, second, and the like will be used only to describe various components, and are not to be interpreted as limiting these components. These terms may be used for the purpose of distinguishing one component from other components.

It will be understood that when an element or layer is referred to as being “over,” “above,” “on,” “below,” “under,” “beneath,” “connected to” or “coupled to” another element or layer, it can be directly over, above, on, below, under, beneath, connected or coupled to the other element or layer or intervening elements or layers may be present. In contrast, when an element is referred to as being “directly over,” “directly above,” “directly on,” “directly below,” “directly under,” “directly beneath,” “directly connected to” or “directly coupled to” another element or layer, there are no intervening elements or layers present.

FIG. 1 is a block diagram of a display device according to one or more embodiments.

Referring to FIG. 1, a display device 10 may include a pixel array 30 and a display driving circuit 20.

A plurality of pixels PX for displaying an image may be disposed in the pixel array 30. At least one pixel PX among the plurality of pixels may include a plurality of gate lines GLs and a plurality of data lines DLs disposed in a direction crossing the plurality of gate lines GLs. The pixel PX may be connected to a corresponding gate line GL among the plurality of gate lines GLs and a corresponding data line DL among the plurality of data lines DLs. The pixel PX may receive a data signal from the data line DL when a gate signal is supplied to the gate line GL. The pixel PX may show light of a preset luminance corresponding to the received data signal. The plurality of pixels PX may display an image by a frame unit.

For example, when the display device 10 is an organic light emitting display device, each of the pixel PXs may include a plurality of transistors including a driving transistor and organic light-emitting diodes. The driving transistor included in the pixel PX may supply a current corresponding to the data signal to the organic light-emitting diode. The organic light-emitting diode may emit light at a preset luminance based on the supplied current.

For example, when the display device 10 is a liquid crystal display device, each of the pixel PXs may include a switching transistor and a liquid crystal capacitor. The pixel PX may control transmittance of a liquid crystal in response to the data signal so that light of a preset luminance may be supplied to the outside.

FIG. 1 illustrates that the pixel PX is connected to one data line DL and one gate line GL, but a connection structure of a signal line of the pixel PX of a display device according to one or more embodiments is not limited thereto. For example, various signal lines may be additionally connected in accordance with the circuit structure of the pixel PX.

The display driving circuit 20 may convert an input image signal IDAT received from the outside into a plurality of analog signals for driving the pixel array 30, such as a plurality of data voltages, and provide the converted plurality of analog signals to the pixel array 30.

The display driving circuit 20 may include a gate driver 230, a data driver 240, a controller 250, a gamma control logic circuit 260, and a gamma voltage generator 270.

The gate driver 230 may be connected to the plurality of gate lines GLs of the pixel array 30, and may sequentially drive the plurality of gate lines GLs of the pixel array 30. The gate driver 230 may generate a plurality of gate signals based on a control signal GS of the controller 250. The plurality of gate signals may be a pulse signal having an enable level and a disable level. The plurality of gate signals may be applied to the plurality of gate lines GLs.

The gate driver 230 may apply the plurality of gate signals to the plurality of gate lines GLs in different manners based on the control signal GS of the controller 250. For example, when a gate signal of the enable level is applied to a pixel PX connected to one gate line among the plurality of gate lines GLs, a data signal applied through the data line DL connected to that pixel PX among the plurality of data lines DLs may be transferred to the pixel PX.

The data driver 240 may be connected to the plurality of data lines DLs, and may output data signals for driving the pixel array 30 through the plurality of data lines DLs. The data driver 240 may output the data signals with respect to each of the plurality of data lines DLs, thereby implementing one frame.

The data driver 240 may receive data and a control signal DS in the form of digital signals from the controller 250. In addition, the data driver 240 may receive a plurality of gamma voltages VG[0:m] from the gamma voltage generator 270.

The data driver 240 may generate the data signals based on the data and the control signal DS. The data driver 240 may convert the data, which may include image data, received from the controller 250 to a data signal in the form of an analog signal, based on the plurality of gamma voltages VG[0:m]).

The data driver 240 may receive the image data in data units corresponding to a plurality of pixels PX included in one horizontal line of the pixel array 30. The image data may include grayscale information corresponding to each pixel PX for displaying the input image signal IDAT on the pixel array 30. The data driver 240 may output a plurality of data signals to the pixel array 30 in horizontal line units through the plurality of data lines DLs. For example, the data driver 240 may transmit the plurality of data signals to the pixel array 30 based on the control signal DS provided from the controller 250.

The data driver 240 may generate white level data W_DATA. The white level data W_DATA may be data indicating a gamma voltage for outputting a white color (i.e., a gamma voltage having a lowest value) to the pixel array 30. The data driver 240 may output the white level data W_DATA to the gamma control logic circuit 260. As will be described later, the white level data W_DATA may be different depending on a mode of the display device 10.

The controller 250 may control an overall operation of the display driving circuit 20. For example, the controller 250 may control operations or functions of the display driving circuit 20 such that the image signal IDAT may be displayed on the pixel array 30, based on the image signal IDAT and a driving control signal CTRL from a host (e.g., a graphics processing unit, an application processor, or the like). For example, the driving control signal CTRL may include a horizontal synchronization signal, a vertical synchronization signal, a main clock signal, and a data enable signal. For example, the controller 250 may generate image data by dividing the input image signal IDAT into one frame unit based on the vertical synchronization signal and dividing the input image signal IDAT into a plurality of gate line GL units based on the horizontal synchronization signal. The controller 250 may detect a porch section where the valid data signal is not generated based on the data enable signal. For example, a porch section may be a section between a first display period (i.e., a period where the image is displayed) in which the valid data signal output and an adjacent second display period, that is, a vertical porch section. The controller 250 may detect a section in which the plurality of gate lines GL are not scanned, i.e., a horizontal porch section.

In one or more embodiments, the controller 250 may generate output image data DATA by converting the format to match the interface specifications with the data driver 240 based on the received input image signal IDAT, and output the image data DATA to the data driver 240.

The controller 250 may further receive a mode signal MS from the host. The controller 250 may determine a mode of the display device 10 based on the mode signal MS. The display device 10 may operate in a mode indicated by the mode signal MS, in each frame. A range of a required gamma voltage may be different according to characteristics of each mode. Accordingly, a separate gamma curve may be set for each mode. For example, when the display device 10 operates in a first mode, a data signal corresponding to the image data DATA may be output by using a gamma voltage corresponding to a first gamma voltage range. Since the range of the required gamma voltage is different depending on respective modes, a gamma voltage required for displaying white color in each mode may also be different.

The controller 250 may control the data driver 240, the gate driver 230, and the gamma control logic circuit 260 based on a control command generated by the controller 250, separately from the driving control signal CTRL received from the host, or in addition to the driving control signal CTRL.

In one or more embodiments, the controller 250 may control an operation timing of the display driving circuit 20. The controller 250 may control operation timings of the data driver 240, the gate driver 230, and the gamma control logic circuit 260 such that the input image signal IDAT may be displayed on the pixel array 30. For example, the controller 250 may generate various control signals GS, DS, and GCS for controlling timings of the gate driver 230, the data driver 240, and the gamma control logic circuit 260. The controller 250 may output the control signal GS to the gate driver 230. The control signal GS may include a signal for controlling the gate level of the plurality of pixels PX. The controller 250 may output the control signal DS to the data driver 240. The control signal DS may include a signal indicating an output of the data signal, such as a switch control signal within the data driver 240, an amplifier control signal, or the like. The controller 250 may output a control signal GCS to the gamma control logic circuit 260. The control signal GCS may include a gamma curve received from the host by the gamma control logic circuit 260, a grayscale value of the image data DATA, data indicating the mode of the display device 10, or the like.

The gamma control logic circuit 260 may generate a gamma voltage control signal GVCS based on the control signal GCS. The gamma control logic circuit 260 may determine a mode of the display device 10 based on the control signal GCS. The gamma control logic circuit 260 may control the gamma voltage generator 270 to generate a plurality of gamma voltages VG[0:m] corresponding to respective modes based on the control signal GCS.

For example, the gamma voltage control signal GVCS may include a gamma amplifier control signal for controlling a plurality of gamma amplifiers inside the gamma voltage generator 270, a gamma amplifier bias signal for controlling a bias voltage applied to the plurality of gamma amplifiers, a gamma decoder control signal for selecting an output of a plurality of gamma decoders inside the gamma voltage generator 270, or the like. The gamma control logic circuit 260 may generate the gamma voltage control signal GVCS based on a preset or separately set gamma curve.

The gamma voltage generator 270 may generate the plurality of gamma voltages VG[0:m] used by the data driver 240 based on the gamma voltage control signal GVCS. For example, the gamma voltage generator 270 may generate the plurality of gamma voltages VG[0:m] according to a preset or separately set gamma curve. For example, the gamma voltage generator 270 may generate the plurality of gamma voltages VG[0:m] by using a resistor string and the gamma amplifier connected to the resistor string.

The gamma voltage generator 270 may determine the number of the plurality of gamma voltages VG[0:m] based on the number of bits that the image data DATA has. In one or more embodiments, the gamma voltage generator 270 may generate the gamma voltages in a quantity greater than the number of the image data DATAs of bits, for relatively high resolution. For example, when the image data DATA is a 8-bit data, the number of the plurality of gamma voltages VG[0:m] may be less than or equal to 210. For example, when the image data DATA is data having N bits, the plurality of gamma voltages VG[0:m] may have different sizes as many as $2^p$ (here, p is greater than N).

In one or more embodiments, the controller 250 may generate a test gamma code. The test gamma code may be a gamma code for detecting a range of the gamma voltage corresponding to respective modes. For example, the test gamma code may be a threshold gamma code, which is a gamma code criterion for distinguishing the modes. For example, when the display device 10 operates in the first mode, the gamma control logic circuit 260 may control the gamma voltage generator 270 to generate the plurality of gamma voltages VG[0:m] corresponding to the first mode. The data driver 240 may receive the plurality of gamma voltages corresponding to the first mode from the gamma voltage generator 270, and generate the data signal corresponding to the test gamma code based on the plurality of gamma voltages and the test gamma code. The data driver 240 may detect a minimum gamma voltage used to generate the data signal corresponding to the test gamma code among the plurality of gamma voltages VG[0:m]. For example, the data driver 240 may determine the minimum gamma voltage required in the first mode as the white level data W_DATA, and transfer the minimum gamma voltage to the gamma control logic circuit 260. The gamma control logic circuit 260 may detect the gamma amplifier that is not driven within the gamma voltage generator 270 while the display device 10 operates in the first mode based on the white level data W_DATA. The gamma control logic circuit 260 may determine a first group including a driving gamma amplifier among the plurality of gamma amplifiers and a second group including a gamma amplifier that is not driven among the plurality of gamma amplifiers. The gamma control logic circuit 260 may control the gamma voltage generator 270 such that a plurality of gamma amplifiers included in the second group may be activated while driving in the first mode.

In one or more embodiments, the gamma control logic circuit 260 may control the gamma voltage generator 270 such that at least a portion of the plurality of gamma amplifiers inside the gamma voltage generator 270 may be inactivated in in the porch section. In one or more embodiments, the gamma control logic circuit 260 may control the gamma voltage generator 270 to inactivate the gamma amplifier that is not used to generate the plurality of gamma voltages VG[0:m] among the plurality of gamma amplifiers.

In one or more embodiments, in the porch section, the gamma control logic circuit 260 may control the gamma voltage generator 270 such that a bias voltage applied to the plurality of gamma amplifiers may decrease. Accordingly, since a current flowing through the plurality of gamma amplifiers decreases, power consumption of the gamma voltage generator 270 may decrease.

In one or more embodiments, in the porch section, the gamma control logic circuit 260 may control the gamma voltage generator 270 such that voltages applied to both ends of a resistor string may be the same. When the voltages applied to the both ends of the resistor string are the same, a current may not flow through the resistor string. Therefore, power consumption of the gamma voltage generator 270 may decrease.

In one or more embodiments, the gamma control logic circuit 260 may be included in the controller 250 or implemented as a separate logic circuit. As another example, the gamma control logic circuit 260 may be implemented as a configuration of a separate processor, software, firmware, or hardware for driving them. The configuration of the display driving circuit 20 may include additional configurations.

For example, a memory or the like storing a lookup table storing the input image signal IDAT for respective frames may be further included. The memory may be referred to as a graphic random access memory (RAM), a frame buffer, or the like. The memory may include a volatile memory such as a dynamic random-access memory (DRAM), a static random-access memory (SRAM), or the like, or a non-volatile memory such as a ROM or a flash memory, a resistive random-access memory (ReRAM), a magnetic random access memory (MRAM), or the like. In one or more embodiments, the display driving circuit 20 may further include other general-purpose components, for example, a clock generator, etc.

In FIG. 1, the gate driver 230, the data driver 240, the controller 250, the gamma control logic circuit 260, and the gamma voltage generator 270 are shown as different function blocks. In one or more embodiments, respective components may be implemented as different semiconductor chips. In another embodiment, at least two components among the gate driver 230, the data driver 240, the controller 250, the gamma control logic circuit 260, and the gamma voltage generator 270 may be implemented in one semiconductor chip. For example, the gate driver 230, the data driver 240, and the gamma control logic circuit 260 may be integrated on one semiconductor chip. In addition, some components may be integrated on the pixel array 30. For example, the gate driver 230 may be integrated on the pixel array 30.

Figure 2:
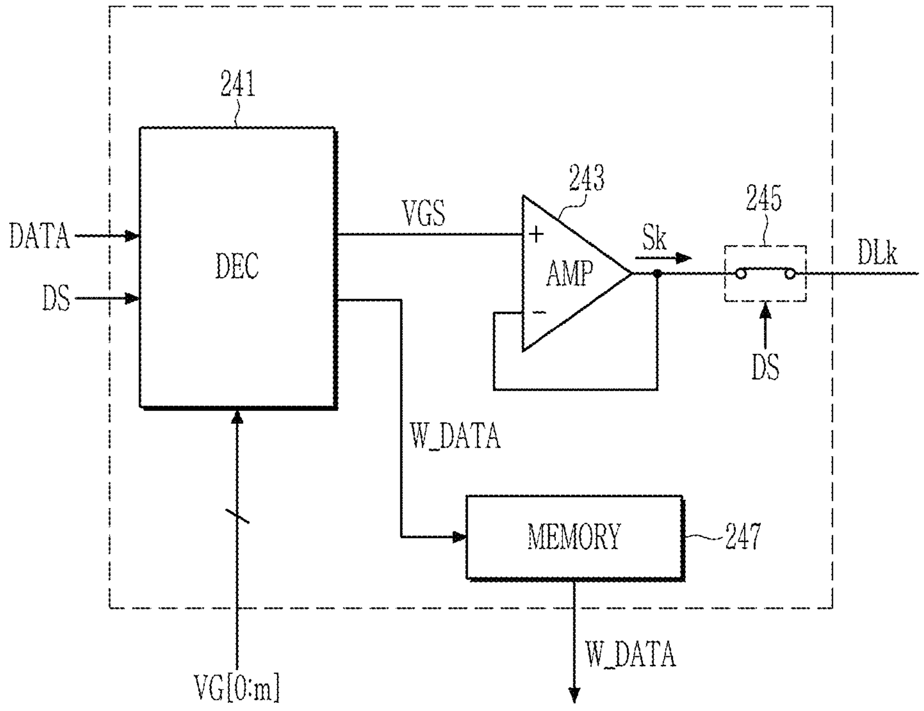
FIG. 2 is a block diagram showing a partial configuration of a data driver according to one or more embodiments.

FIG. 2 is a block diagram showing a partial configuration of a data driver according to one or more embodiments. For example, FIG. 2 is a drawing showing the configuration of the data driver 240 connected to one data line DLk among the plurality of data lines DLs.

The data driver 240 may include a decoder 241, a channel amplifier 243, an output switch 245, and a memory 247.

The decoder 241 may receive the image data DATA and the control signal DS sampled from the controller 250. The decoder 241 may receive the plurality of gamma voltages VG[0:m] from the gamma voltage generator 270. The plurality of gamma voltages VG[0:m] may include gamma voltages corresponding to luminance of various levels depending on the mode of the display device 10.

In one or more embodiments, the decoder 241 may select a voltage of at least a portion among the plurality of gamma voltages VG[0:m] based on the grayscale value of the sampled image data DATA and the control signal DS. For example, the decoder 241 may utilize a separate lookup table defining relationship between the grayscale value and gamma voltages VG0 to VGm, or may select a voltage corresponding to the grayscale value through logic processing on grayscale values. The decoder 241 may output the selected gamma voltage(s) to the channel amplifier 243 as data voltage VGS.

In one or more embodiments, the decoder 241 may detect the gamma voltage required for outputting the data DATA among the plurality of gamma voltages VG[0:m] as the data voltage VGS. The decoder 241 may generate the white level data W_DATA. The white level data W_DATA may be different depending on the mode of the display device 10. The decoder 241 may store the white level data W_DATA in the memory 247.

The channel amplifier 243 may output the data voltage VGS received from the decoder 241 to the pixel connected to the corresponding data line DLk as the data signal.

The channel amplifier 243 may operate based on the control signal DS received from the controller 250. For example, the channel amplifier 243 may be activated when the amplifier control signal within the control signal DS is the enable level, and may amplify the data voltage VGS selected by the decoder 241. The channel amplifier 243 may transmit the amplified voltage to the output switch 245 as a data signal Sk. The channel amplifier 243 may be inactivated when the amplifier control signal within the control signal DS is the disable level. In one or more embodiments, the channel amplifier 243 may be implemented as an operation amplifier.

In one or more embodiments, the channel amplifier 243 may include a first input terminal, a second input terminal through which the data voltage VGS is input from the decoder 241, and an output terminal through which an output voltage is output. The first input terminal of the channel amplifier 243 may be connected to the output terminal of the channel amplifier 243. In one or more embodiments, the first input terminal of the channel amplifier may be an inverting input terminal of the channel amplifier, and the second input terminal may be a non-inverting input terminal of the channel amplifier. An output voltage of the channel amplifier 243 may be input to the inverting input terminal of the channel amplifier 243 as an input voltage. The channel amplifier 243 may be implemented as a unit buffer.

The output switch 245 may be connected to between the data line DLk and the output terminal of the channel amplifier 243. The output switch 245 may drive based on the control signal DS received from the controller 250. For example, when a switch control signal within the control signal DS is the enable level, the output switch 245 may be turned on and may output the data signal Sk output from the output terminal of the channel amplifier 243 to the corresponding data line DLk. When the switch control signal within the control signal DS is the disable level, the output switch 245 may be turned off and may not output the data signal Sk to the data line DLk.

In one or more embodiments, the controller 250 may generate the control signal DS for controlling the data driver 240 such that the output switch 245 may be turned off. Accordingly, the controller 250 may control the data driver 240 such that an unintended data signal Sk may not be output to the pixel array 30. For example, the controller 250 may generate the control signal DS for controlling the data driver 240 such that the output switch 245 may be turned off during a partial section among the porch section.

The memory 247 may store the white level data W_DATA receive from the decoder 241. In one or more embodiments, the white level data W_DATA may include a white level voltage used in that mode, for example, data indicating a lowest gamma voltage.

For example, the memory 247 may be referred to as a graphic random access memory (RAM), a line buffer or the like. The memory may include a volatile memory such as a dynamic random-access memory (DRAM), a static random-access memory (SRAM), or the like, or a non-volatile memory such as a ROM or a flash memory, a resistive random-access memory (ReRAM), a magnetic random access memory (MRAM), or the like.

Figure 3:
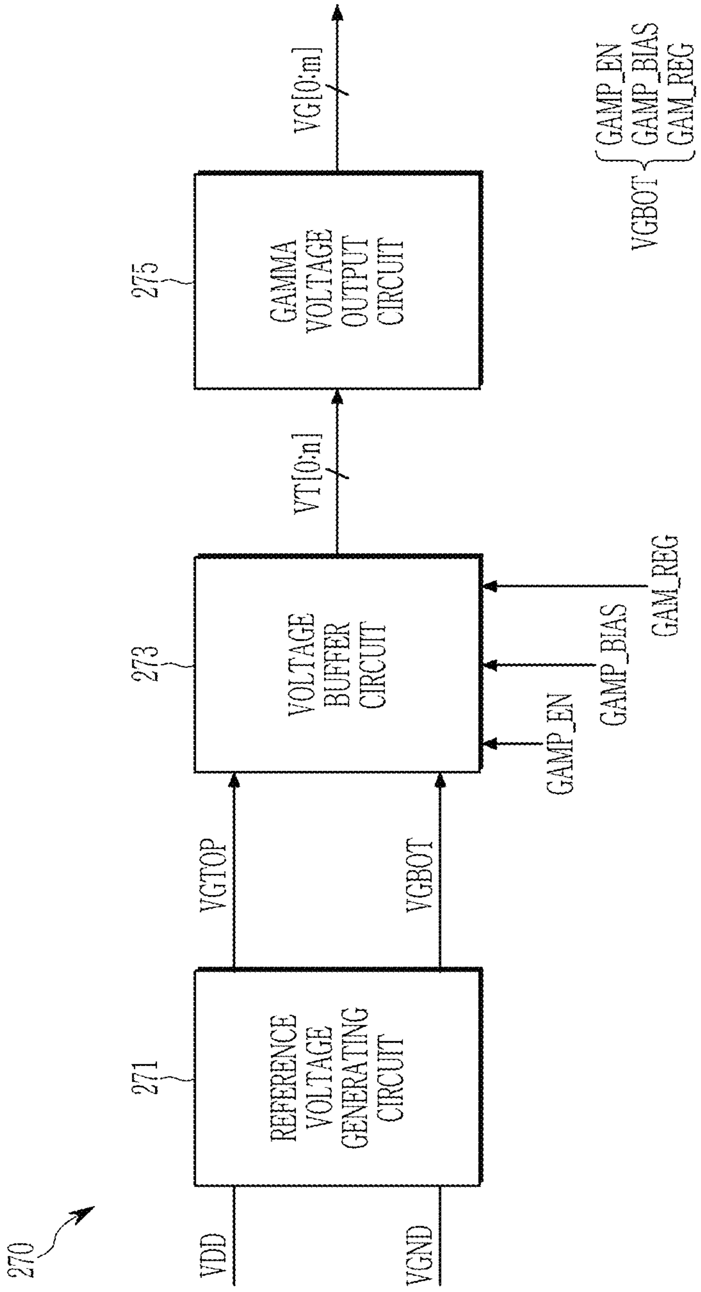
FIG. 3 is a block diagram showing a gamma voltage generator according to one or more embodiments.
Figure 4:
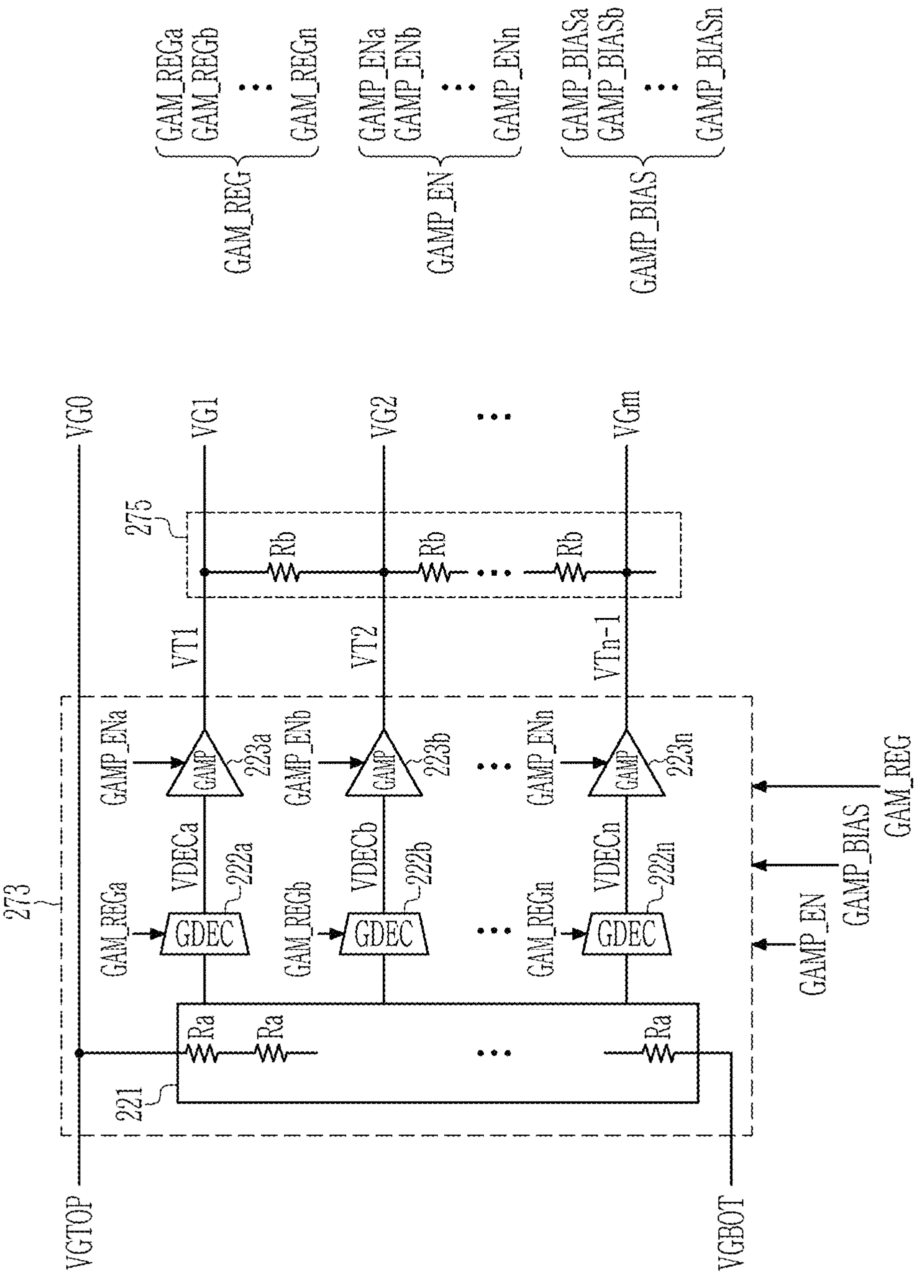
FIG. 4 is a block diagram showing a partial configuration of a gamma voltage generator.

FIG. 3 is a block diagram showing a gamma voltage generator according to one or more embodiments. FIG. 4 is a block diagram showing a partial configuration of a gamma voltage generator.

The gamma voltage generator 270 may include a reference voltage generation circuit 271, a voltage buffer circuit 273, and a gamma voltage output circuit 275.

The reference voltage generation circuit 271 may generate a maximum gamma voltage VGTOP and the minimum gamma voltage VGBOT based on a source voltage VDD and a ground voltage VGND applied from the outside. For example, the reference voltage generation circuit 271 may include the resistor string connected in series between a power source voltage and a ground voltage. A plurality of reference voltages may be output across both ends across respective ones of a plurality of resistors included in the resistor string. In one or more embodiments, the resistance value of each of the plurality of resistors included in the reference voltage generation circuit 271 may be set or adjusted, such that various gamma voltages may be provided according to the gamma curve that is preset or set by the user. The reference voltage generation circuit 271 may select a portion of the plurality of reference voltages, and may output the selected reference voltage to the voltage buffer circuit 273 as the maximum gamma voltage VGTOP and/or the minimum gamma voltage VGBOT.

The voltage buffer circuit 273 may generate a plurality of tab voltages VT[0:n] based on the maximum gamma voltage VGTOP and the minimum gamma voltage VGBOT received from the reference voltage generation circuit 271. For example, the voltage buffer circuit 273 may include a first resistor string, the plurality of gamma decoders, and a gamma amplifier connected to each of the plurality of gamma decoders.

Referring to FIG. 4 together, the voltage buffer circuit 273 may include a first resistor string 221, a plurality of gamma decoders 222*a* and 222*b*, . . . , and 222*n* and a plurality of gamma amplifiers 223*a* and 223*b*, . . . , and 223*n*.

The first resistor string 221 may set a range of the plurality of gamma voltages VG0, . . . , and VGm. The first resistor string 221 may include a plurality of first resistors Ra coupled in series between one end of the first resistor string 221 where the maximum gamma voltage VGTOP is applied and another end thereof where the minimum gamma voltage VGBOT is applied. A voltage between the maximum and minimum gamma voltages VGTOP and VGBOT may be divided into a plurality of reference gamma voltages by the plurality of first resistors Ra. The plurality of first resistors Ra may have the same resistance value. The maximum gamma voltage VGTOP may be a maximum voltage that the gamma voltages VG0, . . . , and VGm may have, and the minimum gamma voltage VGBOT may be a minimum voltage that the gamma voltages VG0, . . . , and VGm may have. In one or more embodiments, the maximum gamma voltage VGTOP may be set as the gamma voltage VG0 of the lowest grayscale.

The gamma decoder 222*a* may select one among the reference gamma voltages divided by the first resistor string 221, based on the gamma decoder control signal GAM_REGa. The gamma decoder 222*a* may output a selected reference gamma voltage to a corresponding gamma amplifier 223*a* as a decoder voltage VDECa. The gamma amplifier 223*a* may output the decoder voltage VDECa input from the gamma decoder 222*a*.

Similarly, each of the gamma decoders 222*b*, . . . , and 222*n* may select one among the reference gamma voltages divided by the first resistor string 221 based on the gamma decoder control signals GAM_REGb, . . . , and GAM_REGn, and may output each of the selected reference gamma voltage to a corresponding gamma amplifier among the gamma amplifiers 223*b*, . . . , and 223*n* as decoder voltages VDECb, . . . , and VDECn. The gamma amplifiers 223*b*, . . . , and 223*n* may output the decoder voltages VDECb, . . . , and VDECn selected by the gamma decoders 222*b*, . . . , and 222*n*, respectively.

In one or more embodiments, the voltage selected by the gamma decoder 222*n* and output through the gamma amplifier 223*n* may be set as a gamma voltage VGm of the maximum grayscale. The voltages output through the gamma amplifiers 223*a* and 223*b*, . . . , and 223*n* may be set as the gamma voltages VG1 and VG2, . . . , and VGm of the intermediate grayscales.

The gamma control logic circuit 260 may generate the gamma decoder control signal GAM_REG such that the plurality of gamma decoders 222*a* and 222*b*, . . . , and 222*n* inside the gamma voltage generator 270 may operate in a default setting and an all-zero setting.

When the gamma voltage generator 270 operates in the default setting, the gamma control logic circuit 260 may generate the gamma decoder control signal GAM_REG for controlling the plurality of gamma decoders 222*a* and 222*b*, . . . , and 222*n* to output corresponding decoder voltages VDECa, VDECb, . . . , and VDECn. The gamma voltage generator 270 may generate gamma voltage based on a plurality of decoder voltages VDECa, VDECb, . . . , and VDECn.

When the gamma voltage generator 270 operates in the all-zero setting, the gamma control logic circuit 260 may generate the gamma decoder control signal GAM_REG for controlling the plurality of gamma decoders 222*a* and 222*b*, . . . , and 222*n* to output the same decoder voltage. The gamma voltage generator 270 may generate gamma voltage based on one decoder voltage.

For example, the gamma control logic circuit 260 may generate the gamma decoder control signal GAM_REG for controlling the plurality of gamma decoders 222*a* and 222*b*, . . . and 222*n* to output the greatest decoder voltage VDECa. Accordingly, all of the plurality of gamma decoders 222*a* and 222*b*, . . . , and 222*n* may output the same the decoder voltage VDECa by corresponding gamma decoder control signals GAM_REGa, GAM_REGb, . . . , and GAM_REGn.

In one or more embodiments, the gamma control logic circuit 260 may generate the gamma decoder control signal GAM_REG such that the plurality of gamma decoders 222*a* and 222*b*, . . . , and 222*n* may operate in the all-zero setting during a partial section among the porch section.

The gamma control logic circuit 260 may preset length of a section during which the gamma voltage generator 270 operates in the all-zero setting during the porch section.

Tab gamma voltages VT1 and VT2, . . . , and VTn-1 output through the plurality of gamma amplifiers 223*a* and 223*b*, . . . , and 223*n* may be set with equal intervals. The plurality of gamma amplifiers 223*a* and 223*b*, . . . , and 223*n* may or may not operate based on gamma amplifier control signals GAMP_ENa, GAMP_ENb, . . . , and GAMP_ENn. For example, when the gamma amplifier control signals GAMP_ENa, GAMP_ENb, . . . , and GAMP_ENn are the enable level, the plurality of gamma amplifiers 223*a* and 223*b*, . . . , and 223*n* may be activated, and may output the tab gamma voltages VT1 and VT2, . . . , and VTn-1. When the gamma amplifier control signals GAMP_ENb, . . . , and GAMP_ENn are the disable level, and the gamma amplifier control signal GAMP_ENa is the enable level, the plurality of gamma amplifiers 223*b*, . . . , and 223*n* may be inactivated, and the gamma amplifier 223*a* may be activated. The activated gamma amplifier 223*a* may output the tab gamma voltage VT1.

The gamma control logic circuit 260 may generate the gamma amplifier control signal GAMP_EN for controlling the gamma voltage generator 270 so as to inactivate the gamma amplifier that is not necessary to generate the plurality of gamma voltages during the porch section. Accordingly, since the current flowing through the plurality of gamma amplifiers decreases, power consumption of the gamma voltage generator 270 may decrease.

The plurality of gamma amplifiers 223*a* and 223*b*, . . . , and 223*n* may drive the decoder voltages VDECa, VDECb, . . . , and VDECn based on levels of the gamma amplifier bias signals GAMP_BIASa, GAMP_BIASb, . . . , and GAMP_BIASn. In one or more embodiments, the plurality of gamma amplifiers 223*a* and 223*b*, . . . , and 223*n* may drive the decoder voltages VDECa, VDECb, . . . , and VDECn based on the gamma amplifier bias signals GAMP_BIASa, GAMP_BIASb, . . . , and GAMP_BIASn indicating a low bias voltage during the porch section.

The gamma control logic circuit 260 may generate the gamma amplifier bias signal GAMP_BIAS such that the plurality of gamma amplifiers 223*a* and 223*b*, . . . , and 223*n* inside the gamma voltage generator 270 may operate in the default setting or a down-setting.

When the gamma voltage generator 270 operates in the default setting, the gamma control logic circuit 260 may generate the gamma amplifier bias signals GAMP_BIASa, GAMP_BIASb, . . . , and GAMP_BIASn for controlling a preset first gamma bias voltage to be applied to the plurality of gamma amplifiers 223*a* and 223*b*, . . . , and 223*n*, and the gamma voltage generator 270 may generate the plurality of gamma voltages based on the gamma amplifier bias signals GAMP_BIASa, GAMP_BIASb, . . . , and GAMP_BIASn indicating the first gamma bias voltage. Here, the gamma amplifier bias signals GAMP_BIASa, GAMP_BIASb, . . . and GAMP_BIASn may be signals for controlling the same first gamma bias voltage to be applied to the plurality of gamma amplifiers 223*a* and 223*b*, . . . , and 223*n*.

When the gamma voltage generator 270 operates in the down-setting, the gamma control logic circuit 260 may generate the gamma amplifier bias signals GAMP_BIASa, GAMP_BIASb, . . . , and GAMP_BIASn for controlling a second gamma bias voltage lower than the preset first gamma bias voltage to be applied to the plurality of gamma amplifiers 223*a* and 223*b*, . . . , and 223*n*, and the gamma voltage generator 270 may generate the plurality of gamma voltages based on the gamma amplifier bias signals GAMP_BIASa, GAMP_BIASb, . . . , and GAMP_BIASn indicating the second gamma bias voltage. Here, the gamma amplifier bias signals GAMP_BIASa, GAMP_BIASb, . . . , and GAMP_BIASn may be signals for controlling the same second gamma bias voltage to be applied to the plurality of gamma amplifiers 223*a* and 223*b*, . . . , and 223*n*.

In one or more embodiments, the gamma control logic circuit 260 may generate the gamma amplifier bias signal GAMP_BIAS such that the plurality of gamma amplifiers 223*a* and 223*b*, . . . , and 223*n* may operate in the down-setting during a partial section among the porch section.

When the plurality of gamma amplifiers 223*a* and 223*b*, . . . , and 223*n* operates in the down-setting based on a low gamma bias voltage, the magnitude of the current flowing through the plurality of gamma amplifiers 223*a* and 223*b*, . . . , and 223*n* decreases compared to the default setting, and accordingly, the current consumption of the gamma voltage generator 270 may decrease.

The gamma control logic circuit 260 may preset length of a section during which the gamma voltage generator 270 operates in the down-setting during the porch section.

Referring back to FIG. 3, the voltage buffer circuit 273 may output the plurality of tab voltages VT[0:n] to the gamma voltage output circuit 275.

The gamma voltage output circuit 275 may output the plurality of gamma voltages VG[0:m] by using the plurality of tab voltages VT[0:n]. For example, the gamma voltage output circuit 275 may include the resistor string in which the plurality of resistors are connected in series. The plurality of tab voltages VT[0:n] may be applied between some resistors of the resistor string, and the plurality of gamma voltages VG[0:m] may be output from between each resistor pair of resistor string.

Referring to FIG. 4 together, the plurality of gamma amplifiers 223*a* and 223*b*, . . . , and 223*n* of the voltage buffer circuit 273 may be connected to a second resistor string 275 of the gamma voltage output circuit 275.

The second resistor string 275 may include a plurality of second resistors Rb. Within a gamma voltage range set in the first resistor string 221, the gamma voltages VG0 and VG1, . . . , and VGm may be generated. The plurality of second resistors Rb may have the same resistance value. The gamma voltages VG0 and VG1, . . . , and VGm may be provided in the data driver 240.

The gamma voltage generator 270 may generate different gamma voltages for respective channels. For example, when the pixel array 30 is configured to display RGB colors, the gamma voltage generator 270 may be configured to generate a plurality of R-channel gamma voltages corresponding to an R-channel, a plurality of G-channel gamma voltages corresponding to a G-channel, and gamma voltages corresponding to a B-channel. However, hereinafter, for brevity of drawings and convenience of description, the gamma voltage generator 270 is described to generate the plurality of gamma voltages corresponding to one channel. However, embodiments are not limited thereto.

Figure 5:
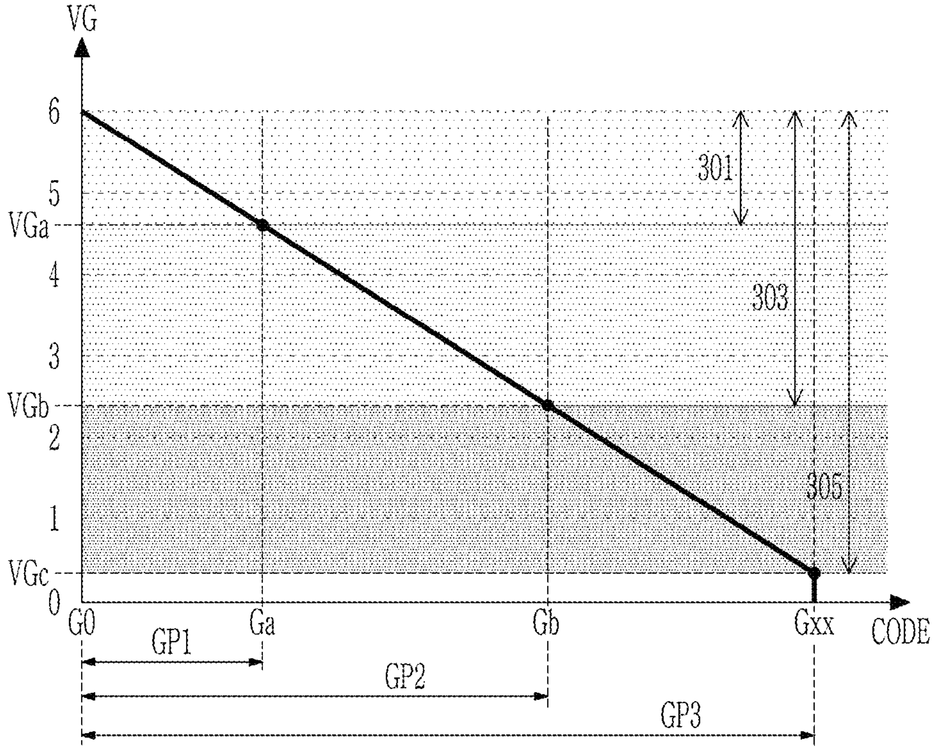
FIG. 5 is a drawing showing a gamma voltage according to a gamma code according to one or more embodiments.
Figure 6:
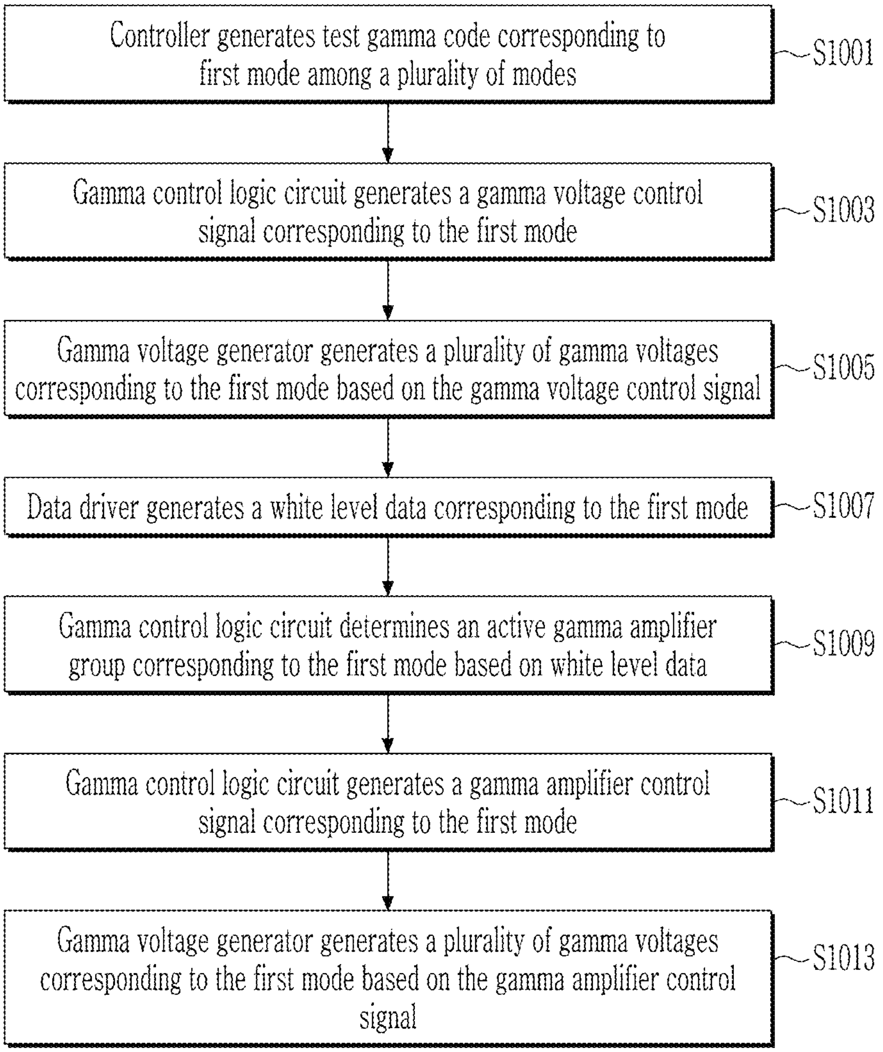
FIG. 6 is a flowchart showing an operation of a display device according to one or more embodiments.

FIG. 5 is a drawing showing a gamma voltage according to a gamma code according to one or more embodiments. FIG. 6 is a flowchart showing an operation of a display device according to one or more embodiments.

As shown in FIG. 5, the gamma voltages VG output from the gamma voltage generator 270 may be linear. For example, the gamma voltages VG may be located on a straight line corresponding to a first-order equation with respect to a gamma code (or, digital input value). The gamma code may indicate the grayscale value of the image data DATA.

When the display device 10 operates in the first mode, the gamma voltage generator 270 may generate a gamma voltage included in a first gamma voltage section 301 corresponding to the gamma code included in a first gamma code section GP1 (i.e., G0 to Ga). For example, the first mode may be a low-power MS (LPM). When operating in the first mode, the data signal output to the pixel array 30 by the data driver 240 may be generated based on the gamma voltage included in the first gamma voltage section 301.

A gamma code Ga having a greatest value in the first gamma code section GP1 may be referred to as the threshold gamma code corresponding to the first mode. At this time, a gamma voltage VGa corresponding to the gamma code Ga may be referred to as a threshold gamma voltage corresponding to the first mode. For example, the threshold gamma code may be the gamma code for outputting white color in the first mode.

When the display device 10 operates in a second mode, the gamma voltage generator 270 may generate a gamma voltage included in a second gamma voltage section 303 corresponding to the gamma code included in a second gamma code section GP2 (i.e., G0 to Gb). For example, the second mode may be a normal mode (normal MS). When operating in the second mode, the data signal output to the pixel array 30 by the data driver 240 may be generated based on the gamma voltage included in the second gamma voltage section 303.

A gamma code Gb having a greatest value in the second gamma code section GP2 may be referred to as the threshold gamma code corresponding to the second mode. At this time, a gamma voltage VGb corresponding to the gamma code Gb may be referred to as the threshold gamma voltage corresponding to the second mode.

When the display device 10 operates in a third mode, the gamma voltage generator 270 may generate a gamma voltage included in a third gamma voltage section 305 corresponding to the gamma code included in a third gamma code section GP3 (i.e., G0 to Gxx). For example, the third mode may be a high-brightness mode (HBM MS). When operating in the third mode, the data signal output to the pixel array 30 by the data driver 240 may be generated based on the gamma voltage included in the third gamma voltage section 305.

A gamma code Gxx having the greatest value in the third gamma code section GP3 may be referred to as the threshold gamma code corresponding to the third mode. At this time, a gamma voltage VGc corresponding to the gamma code Gxx may be referred to as the threshold gamma voltage corresponding to the first mode.

FIG. 6 is a flowchart showing an operation of the display device 10 during the porch section. At step S1001, first, the controller 250 may generate the test gamma code corresponding to the first mode among a plurality of modes.

For example, the gamma control logic circuit 260 may generate a first threshold gamma code corresponding to the first mode as the test gamma code. Here, the first threshold gamma code may be a code having the lowest gamma voltage (i.e., greatest gamma code value, e.g., code value for outputting white) during the first mode.

At step S1003, the gamma control logic circuit 260 may generate the gamma voltage control signal GVCS corresponding to the first mode.

The gamma control logic circuit 260 may generate the gamma voltage control signal GVCS based on the gamma curve indicating a correspondence between the gamma code and the gamma voltage when the display device 10 operates in the first mode. The gamma curve may be preset.

At step S1005, the gamma voltage generator 270 may generate the plurality of gamma voltages corresponding to the first mode based on the gamma voltage control signal GVCS.

The gamma voltage generator 270 may transfer the plurality of gamma voltages generated corresponding to the first mode to the data driver 240.

At step S1007, the data driver 240 may generate white level data corresponding to the first mode.

For example, the data driver 240 may select at least one gamma voltage of the plurality of gamma voltages in order to generate the data signal corresponding to the test gamma code. The data driver 240 may generate the white level data W_DATA based on the selected gamma voltage. For example, in FIG. 5, when the first threshold gamma code Ga is used as the test gamma code, the white level data W_DATA may indicate the gamma voltage VGa.

The data driver 240 may transfer the white level data W_DATA to the gamma control logic circuit 260.

At step S1009, the gamma control logic circuit 260 may determine an active gamma amplifier group corresponding to the first mode based on the white level data W_DATA.

For example, the gamma control logic circuit 260 may detect the threshold gamma voltage corresponding to the first mode based on the white level data W_DATA. The gamma control logic circuit 260 may detect the driving gamma amplifier among the plurality of gamma amplifiers of the gamma voltage generator 270 when the display device 10 operates in the first mode based on the white level data W_DATA. For example, in FIG. 5, when the threshold gamma voltage is the gamma voltage VGa, the gamma amplifier used in order to generate the gamma voltage greater than the gamma voltage VGa may be driven. When the display device 10 operates in the first mode, the gamma control logic circuit 260 may determine the gamma amplifier that is driving among the plurality of gamma amplifiers of the gamma voltage generator 270 as the first group, and may determine the gamma amplifier that is not driven as the second group. Hereinafter, the first group may be the active gamma amplifier group, and the second group may be a non-active gamma amplifier group.

Thereafter, at step S1011, the gamma control logic circuit 260 may generate the gamma amplifier control signal corresponding to the first mode.

For example, when the data DATA is received corresponding to the first mode, the gamma control logic circuit 260 may activate at least one gamma amplifier included in the active gamma amplifier group corresponding to the first mode, and may generate a plurality of gamma amplifier control signals GAMP_EN for inactivating at least one gamma amplifier included in the non-active gamma amplifier group.

Thereafter, at step S1013, the gamma voltage generator 270 may generate the plurality of gamma voltages corresponding to the first mode based on the gamma amplifier control signal GAMP_EN.

The gamma voltage generator 270 may inactivate the gamma amplifier(s) included in the non-active gamma amplifier group based on the gamma amplifier control signal GAMP_EN. The gamma voltage generator 270 may generate the plurality of gamma voltages required for the first mode by using at least one gamma amplifier included in the active gamma amplifier group.

In one or more embodiments, the display device 10 may perform the step S1001 to step S1013 described above in the porch section. In one or more embodiments, the display device 10 may perform the step S1001 to step S1013 in some porch sections among a plurality of porch sections. For example, the display device 10 may perform the step S1001 to step S1013 at every preset period.

Figure 7:
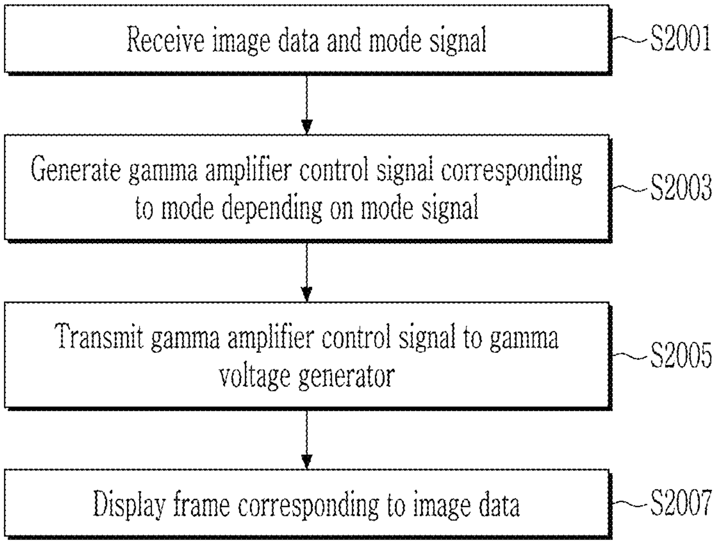
FIG. 7 is a flowchart showing an operation of a display device according to one or more embodiments.

FIG. 7 is a flowchart showing an operation of a display device according to one or more embodiments.

For example, FIG. 7 is a flowchart showing the operation of the display device 10 after the gamma control logic circuit 260 determines the active gamma amplifier group and the non-active gamma amplifier group depending on respective modes.

First, at step S2001, the controller 250 may receive the image data DATA and the mode signal MS.

The controller 250 may generate the control signal GCS based on the mode signal MS, and may transfer the control signal GCS to the gamma control logic circuit 260.

At step S2003, the gamma control logic circuit 260 may generate the gamma amplifier control signal corresponding to a mode according to the mode signal MS.

For example, as described with reference to FIG. 6, the gamma control logic circuit 260 may determine the active gamma amplifier group and a non-active gamma group corresponding to respective modes based on the white level data W_DATA during the porch section. The gamma control logic circuit 260 may activate the gamma amplifier included in the active gamma amplifier group corresponding to the mode, and may generate the gamma amplifier control signal GAMP_EN for controlling the gamma voltage generator 270, so as to inactivate the gamma amplifier included in the non-active gamma group.

Thereafter, at step S2005, the gamma control logic circuit 260 may transmit the gamma amplifier control signal GAMP_EN to the gamma voltage generator 270.

The gamma voltage generator 270 may generate the plurality of gamma voltages by using the gamma amplifier included in the active gamma group based on the gamma amplifier control signal GAMP_EN. The data driver 240 may generate the data signal based on the plurality of gamma voltages and the image data DATA generated by using the gamma amplifier included in the active gamma group.

At step S2007, the pixel array 30 may display a frame corresponding to the image data DATA.

Figure 8:
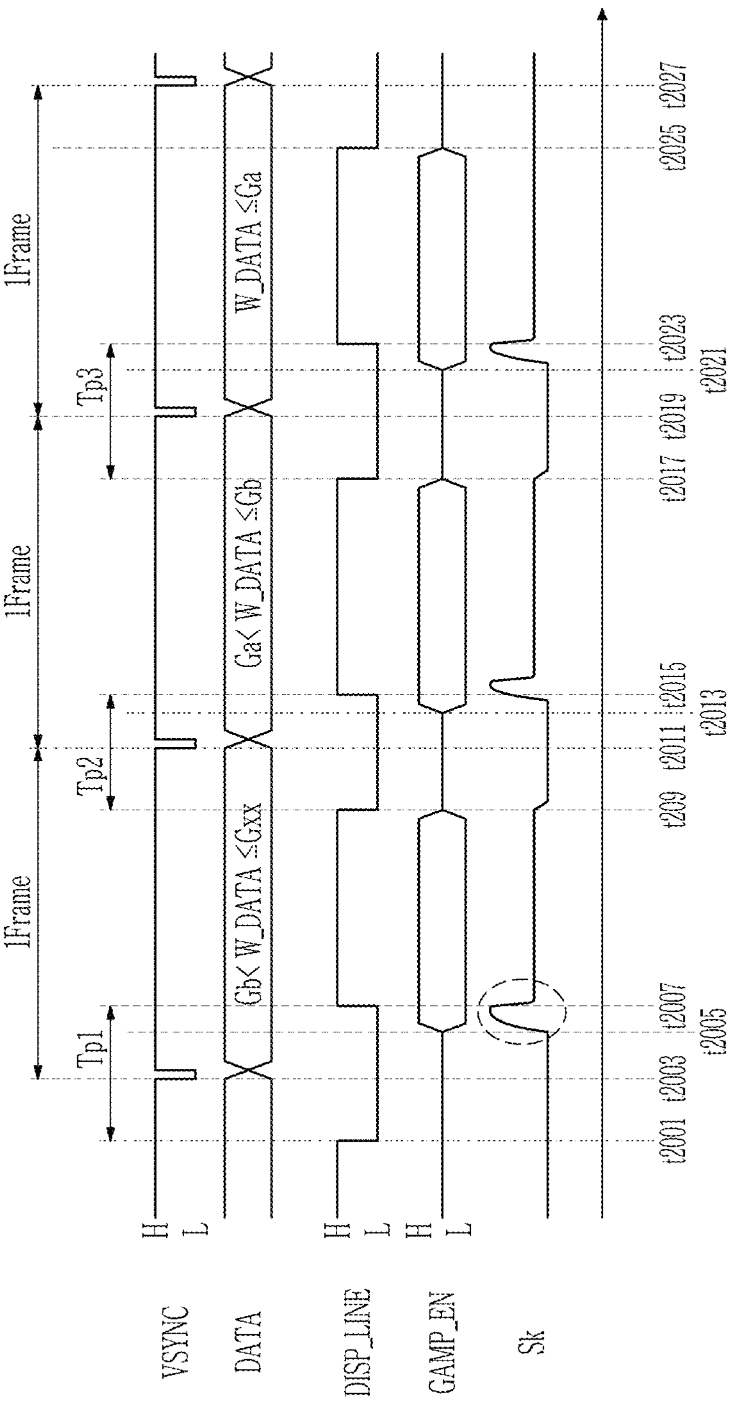
FIG. 8 is a timing diagram showing an operation of a display device according to one or more embodiments.
Figure 9:
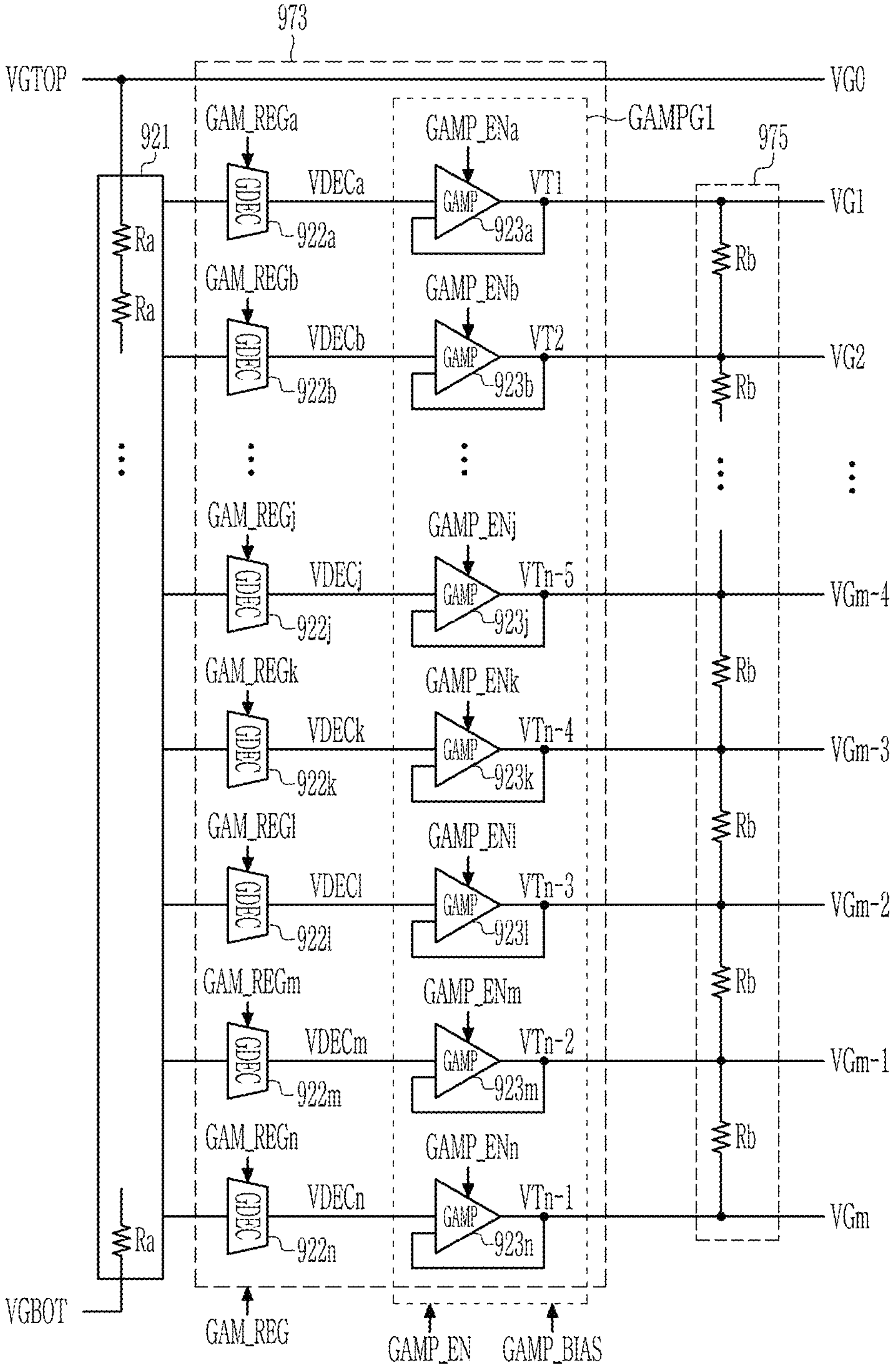
FIGS. 9, 10, and 11 are drawings for explaining an operation of a display device according to FIG. 8.
Figure 10:
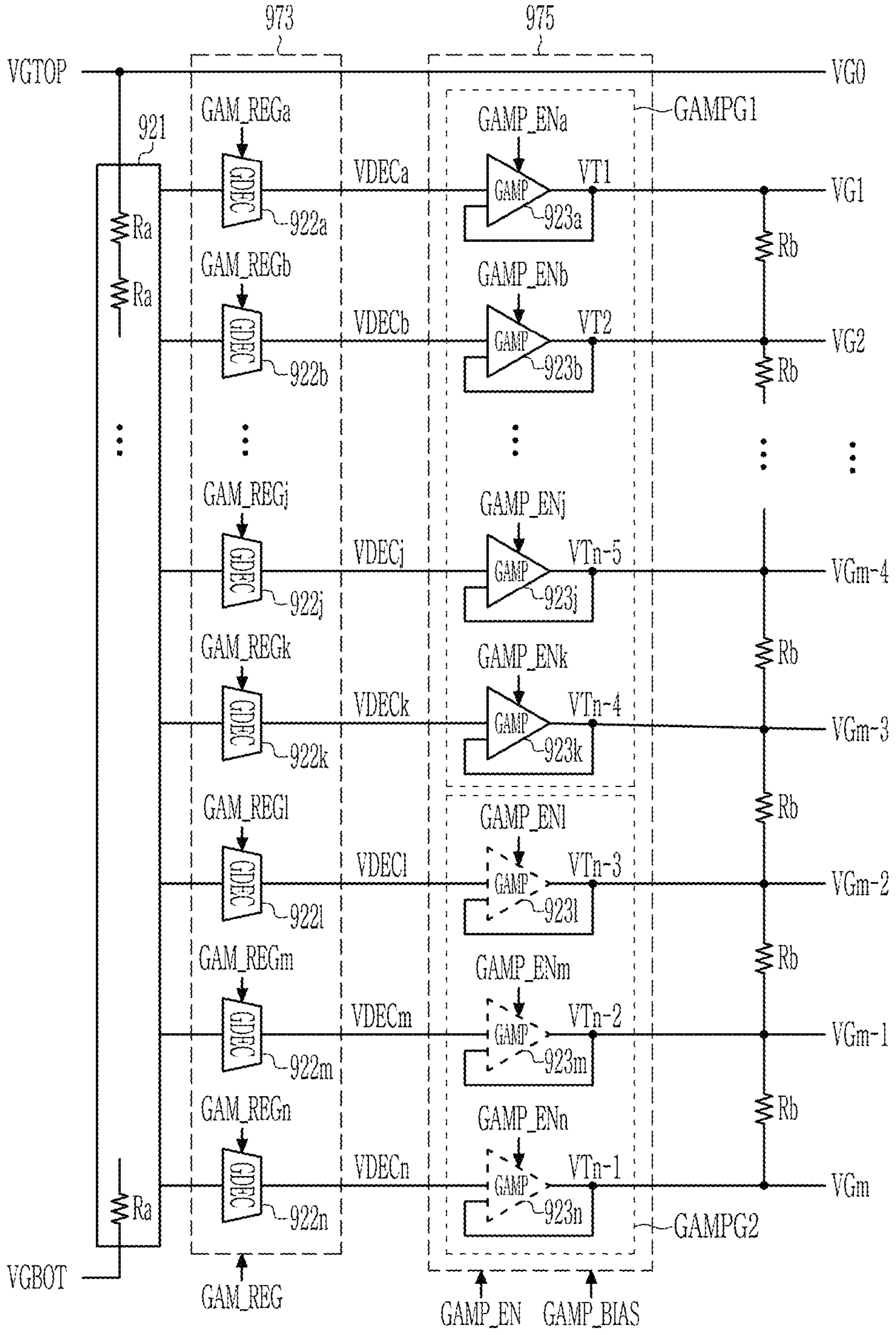
Figure 11:
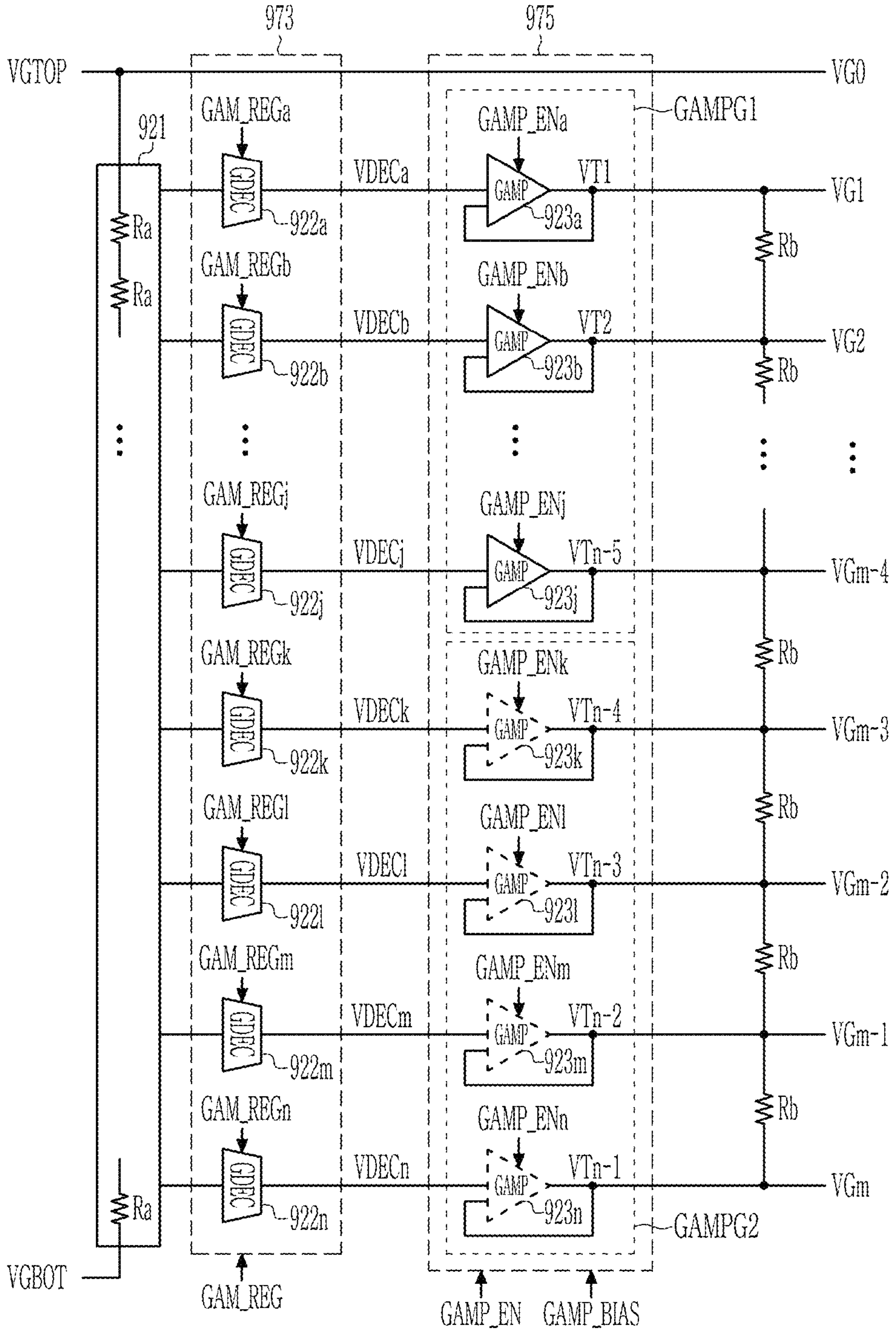

FIG. 8 is a timing diagram showing an operation of a display device according to one or more embodiments. FIGS. 9 to 11 are drawings for explaining an operation of a display device according to FIG. 8.

First, at t2001, a display signal DISP_LINE may transition from a logic level "H" to the logic level "L".

The display signal DISP_LINE may be a signal for indicating a display section where an image according to the image signal IDAT is display to the display device 10. The display section may be a section within one frame period (1Frame) excluding the porch section. When the display signal DISP_LINE is at the logic level "H", the image may be displayed, and when it is at the logic level "L", the image may not be displayed.

At t2003, a vertical synchronization signal VSYNC may transition from the logic level "H" to the logic level "L".

The controller 250 may receive the input image signal IDAT and the mode signal MS with respect to a subsequent frame within a preset period after the vertical synchronization signal VSYNC. The controller 250 may generate the image data DATA and the control signal GCS based on the input image signal IDAT and the mode signal MS.

The porch section Tp1 (i.e., t2001 to t2007) may include a period in which the vertical synchronization signal VSYNC is at the logic level "L" and periods therearound. The porch section Tp1 may be a section in which the display signal DISP_LINE is at the logic level "L".

The gamma control logic circuit 260 may generate the test gamma code corresponding to a mode according to the mode signal MS in a partial section (e.g., t2003 to t2005) within the porch section Tp1. The data driver 240 may detect the white level data W_DATA based on the test gamma code. The gamma control logic circuit 260 may detect the active gamma amplifier group and the non-active gamma amplifier group based on the white level data W_DATA. Thereafter, the gamma control logic circuit 260 may generate the gamma amplifier control signal GAMP_EN corresponding to the mode. For example, the image data DATA may generate the gamma amplifier control signal GAMP_EN corresponding to the corresponding mode. For example, referring to the above-described FIG. 5 together, the data DATA may indicate a value that is greater than the gamma code Gb and smaller than the gamma code Gxx, and accordingly, the display device 10 may operate in the first mode. The gamma control logic circuit 260 may generate the test gamma code Gxx corresponding to the first mode. The white level data W_DATA corresponding to the test gamma code Gxx may indicate the gamma voltage VGc. Accordingly, the gamma voltage generator 270 may generate a range of the gamma voltage included in the third gamma code section GP3 (i.e., G0 to Gxx) in the first mode.

The gamma control logic circuit 260 may determine the active gamma amplifier group and the non-active gamma amplifier group corresponding to the first mode based on the white level data W_DATA indicating the gamma voltage VGc. For example, the gamma control logic circuit 260 may determine that all of the plurality of gamma amplifiers correspond to the first mode are included in the active gamma amplifier group, and may generate the gamma amplifier control signal GAMP_EN that controls the plurality of gamma amplifiers included in the active gamma amplifier group among the plurality of gamma amplifiers to be activated.

At t2005, the gamma control logic circuit 260 may output the gamma amplifier control signal GAMP_EN.

Referring to FIG. 9 together, the gamma control logic circuit 260 may determine that all of a plurality of gamma amplifiers 923*a*, 923*b*, . . . , and 923*n* are included in the active gamma amplifier group GAMPG1, and may generate a plurality of gamma amplifier control signals GAMP_ENa, GAMP_ENb, . . . , and GAMP_ENn having an enable logic level "H" to the plurality of gamma amplifiers 923*a*, 923*b*, . . . , and 923*n* included in the active gamma amplifier group GAMPG1. Accordingly, the gamma voltage generator 270 may generate all of the plurality of gamma voltages VG0 to VGm. For example, the plurality of gamma amplifiers 923 may generate a gamma voltage included in the third gamma voltage section 305 (see FIG. 5) corresponding to the gamma code included in the third gamma code section GP3 (i.e., G0 to Gxx; see FIG. 5).

The gamma voltage generator 270 may generate the plurality of gamma voltages VG0 to VGm based on the gamma amplifier control signal GAMP_EN, before the porch section Tp2, i.e., during t2005 to t2009.

The data driver 240 may generate the data signal based on the plurality of gamma voltages. When the plurality of inactivated gamma amplifiers are activated, abrupt fluctuation may occur in levels of the gamma voltages in a specific range output through a second resistor string 975. Due to the level change of the gamma voltage, voltages of the plurality of data lines DLs controlled by the data driver 240 may become unstable. Accordingly, in a section of t2005 to t2007, the data signal Sk may abruptly fluctuate.

At t2007, the display signal DISP_LINE may transition from the logic level "L" to the logic level "H".

During t2007 to t2009, the display device 10 may display a screen corresponding to the image data DATA.

At t2009, the display signal DISP_LINE may transition from the logic level "H" to the logic level "L".

At time point t2011, the vertical synchronization signal VSYNC may transition from the logic level "H" to the logic level "L".

The porch section Tp2 (i.e., t2009 to t2015) may include a period in which the vertical synchronization signal VSYNC is at the logic level "L" and periods therearound.

The gamma control logic circuit 260 may generate the test gamma code corresponding to a mode according to the mode signal MS in a partial section (e.g., t2011 to t2013) within the porch section Tp2.

For example, referring to the above-described FIG. 5 together, the data DATA may indicate a value that is greater than the gamma code Ga and smaller than the gamma code Gb, and accordingly, the display device 10 may operate in the second mode. The gamma control logic circuit 260 may generate the test gamma code Gb corresponding to the second mode. The white level data W_DATA corresponding to the test gamma code Gb may indicate the gamma voltage VGb. Accordingly, the gamma voltage generator 270 may generate a range of the gamma voltage included in the second gamma code section GP2 (i.e., G0 to Gb) in the second mode.

The gamma control logic circuit 260 may determine the active gamma amplifier group and the non-active gamma amplifier group corresponding to the second mode based on the white level data W_DATA indicating the gamma voltage VGb. For example, the gamma control logic circuit 260 may determine that at least one gamma amplifier among the plurality of gamma amplifiers corresponding to the second mode is included in the active gamma amplifier group, and may generate the gamma amplifier control signal GAMP_EN for controlling the plurality of gamma amplifiers included in the active gamma amplifier group among the plurality of gamma amplifiers to be activated. In addition, the gamma control logic circuit 260 may generate the gamma amplifier control signal GAMP_EN for controlling the plurality of gamma amplifiers included in the non-active gamma amplifier group among the plurality of gamma amplifiers to be inactivated.

At t2013, the gamma control logic circuit 260 may output the gamma amplifier control signal GAMP_EN.

Referring to FIG. 10 together, the gamma control logic circuit 260 may determine that a plurality of gamma amplifiers 923*a*, 923*b*, . . . , and 923*j*, and 923*k* among the plurality of gamma amplifiers 923*a*, 923*b*, . . . , and 923*n* are included in the active gamma amplifier group GAMPG1, and a plurality of gamma amplifiers 923*l*, 923*m*, and 923*n* are included in the non-active gamma amplifier group GAMPG2. Accordingly, the gamma control logic circuit 260 may generate a plurality of gamma amplifier control signals GAMP_ENa, GAMP_ENb, . . . , GAMP_ENj, and GAMP_ENk for having the enable logic level "H" to the plurality of gamma amplifiers 923*a*, 923*b*, . . . , and 923*j*, and 923*k* included in the active gamma amplifier group GAMPG1. In addition, the gamma control logic circuit 260 may generate a plurality of gamma amplifier control signals GAMP_ENI, GAMP_ENm, and GAMP_ENn for having the disable logic level "L" to the plurality of gamma amplifiers 923*l*, 923*m*, and 923*n* included in the non-active gamma amplifier group GAMPG2.

Accordingly, the gamma voltage generator 270 may generate the plurality of gamma voltages VG0 to VGm-3. For example, the plurality of gamma amplifiers 923 may generate a gamma voltage included in the second gamma voltage section 303 (see FIG. 5) corresponding to the gamma code included in the second gamma code section GP2 (i.e., G0 to Gb).

The gamma voltage generator 270 may generate the plurality of gamma voltages VG0 to VGm-3 based on the gamma amplifier control signal GAMP_EN, before the porch section Tp3, i.e., during t2013 to t2017.

At t2015, the display signal DISP_LINE may transition from the logic level "L" to the logic level "H".

During t2015 to t2017, the display device 10 may display a screen corresponding to the image data DATA.

At t2017, the display signal DISP_LINE may transition from the logic level "H" to the logic level "L".

At time point t2019, the vertical synchronization signal VSYNC may transition from the logic level "H" to the logic level "L".

The porch section Tp3 (i.e., t2017 to t2023) may include a period in which the vertical synchronization signal VSYNC is at the logic level "L" and periods therearound.

The gamma control logic circuit 260 may generate the test gamma code corresponding to a mode according to the mode signal MS in a partial section (e.g., t2019 to t2021) within the porch section Tp3.

For example, referring to the above-described FIG. 5 together, since the data DATA indicates a value smaller than the gamma code Ga, the display device 10 may operate in the third mode. The gamma control logic circuit 260 may generate the test gamma code Ga corresponding to the third mode. The white level data W_DATA corresponding to the test gamma code Ga may indicate the gamma voltage VGa. Accordingly, the gamma voltage generator 270 may generate a range of the gamma voltage included in the third gamma code section GP3 (i.e., G0 to Gxx) in the third mode.

The gamma control logic circuit 260 may determine the active gamma amplifier group and the non-active gamma amplifier group corresponding to the third mode based on the white level data W_DATA indicating the gamma voltage VGa. For example, the gamma control logic circuit 260 may determine that at least one gamma amplifier among the plurality of gamma amplifiers corresponding to the third mode is included in the active gamma amplifier group, and may generate the gamma amplifier control signal GAMP_EN for controlling the plurality of gamma amplifiers included in the active gamma amplifier group among the plurality of gamma amplifiers to be activated. In addition, the gamma control logic circuit 260 may generate the gamma amplifier control signal GAMP_EN for controlling the plurality of gamma amplifiers included in the non-active gamma amplifier group among the plurality of gamma amplifiers to be inactivated.

At t2021, the gamma control logic circuit 260 may output the gamma amplifier control signal GAMP_EN.

Referring to FIG. 11 together, the gamma control logic circuit 260 may determine that the plurality of gamma amplifiers 923*a*, 923*b*, . . . , and 923*j* among the plurality of gamma amplifiers 923*a*, 923*b*, . . . , and 923*n* are included in the active gamma amplifier group GAMPG1, and a plurality of gamma amplifiers 923*k*, 923*l*, 923*m*, and 923*n* are included in the non-active gamma amplifier group GAMPG2. Accordingly, the gamma control logic circuit 260 may generate a plurality of gamma amplifier control signals GAMP_ENa, GAMP_ENb, . . . , and GAMP_ENj for having the enable logic level "H" to the plurality of gamma amplifiers 923*a*, 923*b*, . . . , and 923*j* included in the active gamma amplifier group GAMPG1. In addition, the gamma control logic circuit 260 may generate a plurality of gamma amplifier control signals GAMP_ENk, GAMP_ENI, GAMP_ENm, and GAMP_ENn for having the disable logic level "L" to the plurality of gamma amplifiers 923*k*, 923*l*, 923*m*, and 923*n* included in the non-active gamma amplifier group GAMPG2.

Accordingly, the gamma voltage generator 270 may generate the plurality of gamma voltages VG0 to VGm-4. For example, the plurality of gamma amplifiers 923 may generate a gamma voltage included in the first gamma voltage section 301 (see FIG. 5) corresponding to the gamma code included in the first gamma code section GP1 (i.e., G0 to Ga).

The gamma voltage generator 270 may generate the plurality of gamma voltages VG0 to VGm-4 based on the gamma amplifier control signal GAMP_EN, before the porch section, i.e., during t2023 to t2025.

Figure 12:
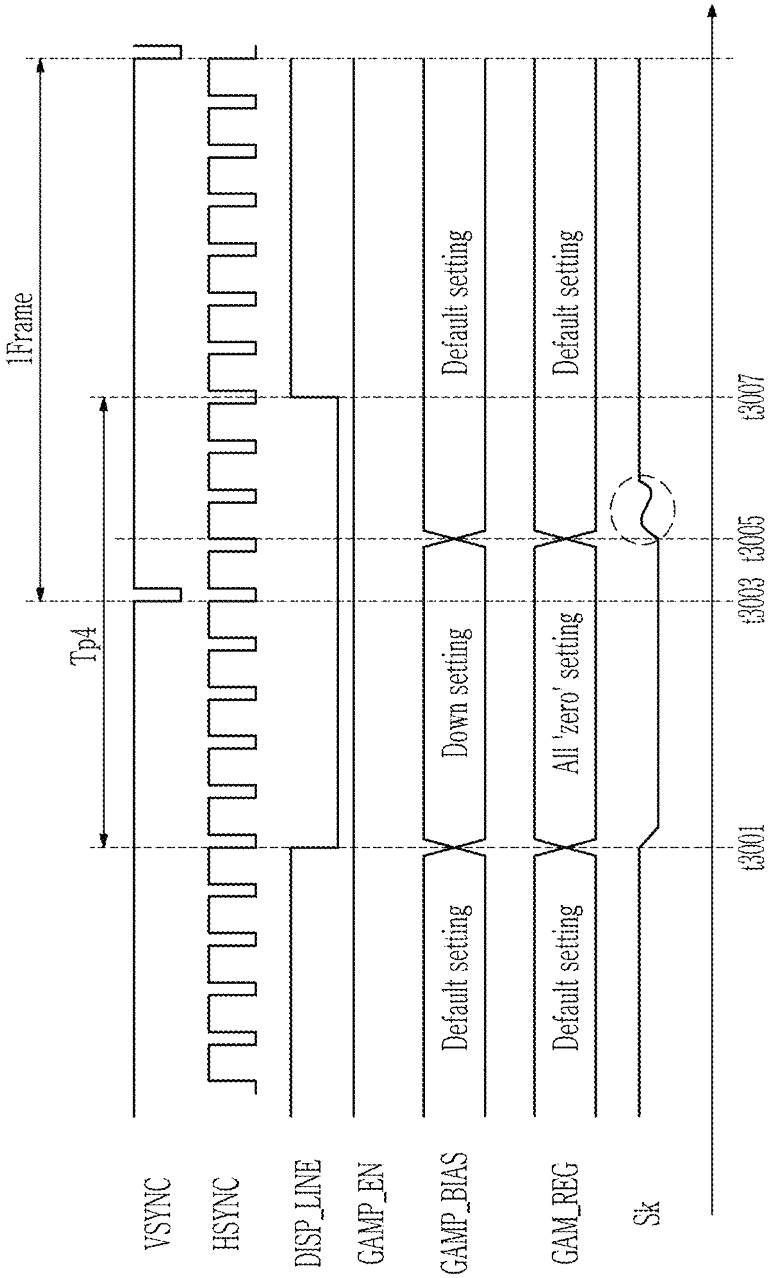
FIG. 12 is a timing diagram showing an operation of a display device according to one or more embodiments.

FIG. 12 is a timing diagram showing an operation of a display device according to one or more embodiments.

At t3001, the display signal DISP_LINE may transition from the logic level "H" to the logic level "L". A section in which the display signal DISP_LINE is at the logic level "L" may be the porch section Tp4 (i.e., t3001 to t3007).

At t3001, the gamma control logic circuit 260 may generate the gamma amplifier bias signal GAMP_BIAS such that the plurality of gamma amplifiers 223*a* and 223*b*, . . . , and 223*n* (see FIG. 4) may operate in the down-setting.

As described above, when operating in the down-setting, the gamma control logic circuit 260 may generate the gamma amplifier bias signal GAMP_BIAS for controlling the second gamma bias voltage lower than the first gamma bias voltage applied when operated in the default setting to be applied to the plurality of gamma amplifiers 223*a* and 223*b*, . . . , and 223*n* (see FIG. 4). The gamma voltage generator 270 may generate the plurality of gamma voltages based on the gamma amplifier bias signal GAMP_BIAS indicating the second gamma bias voltage.

The gamma control logic circuit 260 may preset length of a section of operating in the down-setting during which the porch section. For example, the section of operating in the down-setting may be set by the number of toggles of the horizontal synchronization signal HSYNC based on the time point at which the vertical synchronization signal VSYNC transitions to the logic level "L".

FIG. 12 illustrates that the gamma voltage generator 270 operates in the down-setting during t3001 to t3005, but embodiments are not limited thereto, and it may operate in the down-setting during an arbitrary period within the porch section Tp4.

When the plurality of gamma amplifiers 223*a* and 223*b*, . . . , and 223*n* operates in the down-setting based on a low gamma bias voltage, the magnitude of the current flowing through the plurality of gamma amplifiers 223*a* and 223*b*, . . . , and 223*n* decreases compared to the default setting, and accordingly, the current consumption of the gamma voltage generator 270 may decrease.

In addition, at t3001, the gamma control logic circuit 260 may generate the gamma decoder control signal GAM_REG for operating the plurality of gamma decoders 222*a* and 222*b*, . . . , and 222*n* (see FIG. 4) in the all-zero setting.

As described above, when operating in the all-zero setting, the gamma control logic circuit 260 may generate the gamma decoder control signal GAM_REG for controlling the plurality of gamma decoders 222*a* and 222*b*, . . . , and 222*n* to output the same decoder voltage. The gamma voltage generator 270 may generate gamma voltage based on one decoder voltage. For example, the same voltage may be applied to both ends of the second resistor string 275 (see FIG. 4) of the gamma voltage generator 270.

The gamma control logic circuit 260 may preset length of a section of operating in the all-zero setting during which the porch section. For example, the section of operating in the down-setting may be set by the number of toggles of the horizontal synchronization signal HSYNC based on the time point at which the vertical synchronization signal VSYNC transitions to the logic level "L".

FIG. 12 illustrates that the gamma voltage generator 270 operates in the all-zero setting during t3001 to t3005, but embodiments are not limited thereto, and it may operate in the down-setting during an arbitrary period within the porch section Tp4.

When the plurality of gamma decoders 222*a* and 222*b*, . . . , and 222*n* operate in the all-zero setting, the magnitude of the current flowing through the second resistor string 275 (see FIG. 4) decreases compared to the default setting, and accordingly, the current consumption of the gamma voltage generator 270 may decrease.

At t3003, the vertical synchronization signal VSYNC may transition from the logic level "H" to the logic level "L".

At t3005, the gamma control logic circuit 260 may generate the gamma amplifier bias signal GAMP_BIAS and the gamma decoder control signal GAM_REG such that the plurality of gamma amplifiers 223*a* and 223*b*, . . . , and 223*n* and the plurality of gamma decoders 222*a* and 222*b*, . . . , and 222*n* may operate in the default setting.

When the gamma voltage generator 270 operates in the default setting, the gamma control logic circuit 260 may generate the gamma amplifier bias signal GAMP_BIAS for controlling the first gamma bias voltage higher than the second gamma bias voltage applied when operated in the down-setting to be applied to the plurality of gamma amplifiers 223*a* and 223*b*, . . . , and 223*n*. The gamma voltage generator 270 may generate the plurality of gamma voltages based on the gamma amplifier bias signal GAMP_BIAS indicating the first gamma bias voltage.

When the gamma voltage generator 270 operates in the default setting, the gamma control logic circuit 260 may generate the gamma decoder control signal GAM_REG for controlling the plurality of gamma decoders 222*a* and 222*b*, . . . , and 222*n* to output the preset decoder voltages VDECa, VDECb, . . . , and VDECn. The gamma voltage generator 270 may generate the gamma voltages VG[0:m] based on the plurality of decoder voltages VDECa, VDECb, . . . , and VDECn.

The gamma amplifier control signal GAMP_EN may maintain the logic level "H" during t3001 to t3007. That is, the plurality of gamma amplifiers 223*a* and 223*b*, . . . , and 223*n* may maintain an activation state in the porch section Tp4.

The data driver 240 may generate the data signal based on the plurality of gamma voltages generated at the gamma voltage generator 270. When the gamma control logic circuit 260 operates the gamma voltage generator 270 according to the down-setting and the all-zero setting, the current flowing through the plurality of gamma amplifiers 223*a* and 223*b*, . . . , and 223*n* and the second resistor string 275 may be decreased. Accordingly, even when the gamma control logic circuit 260 operates the gamma voltage generator 270 in the default setting, abrupt fluctuation may not occur in the level of gamma voltages output through the plurality of gamma amplifiers 223*a* and 223*b*, . . . , and 223*n* and the second resistor string 275. For example, at t3005, as shown in the drawings, the fluctuation of the data signal Sk may not be large.

Figure 13:
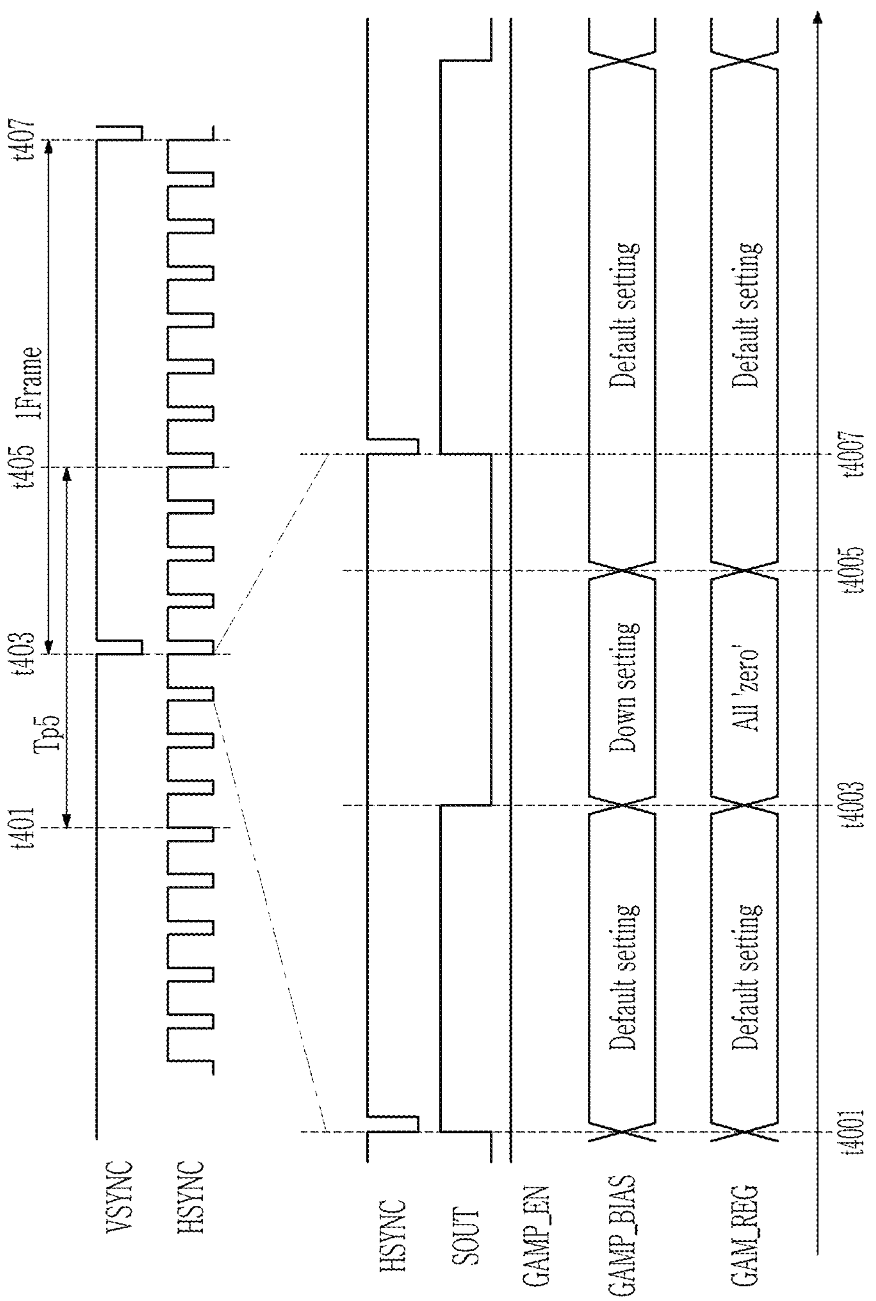
FIG. 13 is a timing diagram showing an operation of a display device according to one or more embodiments.

FIG. 13 is a timing diagram showing an operation of a display device according to one or more embodiments.

In one or more embodiments, when the display device 10 operates in a low frequency and has a low resolution, a horizontal line time included in one frame (1Frame) may increase. Accordingly, the gamma control logic circuit 260 may generate the gamma voltage control signal GVCS such that the gamma voltage generator 270 may operate in the down-setting and the all-zero setting.

As shown in FIG. 13, pulse periods t403 to t407 of the vertical synchronization signal VSYNC may be one frame period (1 FRAME) according to the display frame rate.

The porch section Tp5 (i.e., t401 to t405) may include a period in which the vertical synchronization signal VSYNC is at a logic level "L" and periods therearound.

At t4001, the horizontal synchronization signal HSYNC may transition from the logic level "H" to the logic level "L". After a preset time, the horizontal synchronization signal HSYNC may transition from the logic level "L" to the logic level "H".

The controller 250 may apply the data signal to the plurality of data lines DLs by being synchronized to the horizontal synchronization signal HSYNC. For example, whenever each pulse of the horizontal synchronization signal HSYNC is applied, the controller 250 may apply the data signal corresponding to the pixel PX connected to the gate line GL to which the gate signal is applied to the data line DL.

In addition, at t4001, the control signal DS may transition from the logic level "L" to the logic level "H". Here, the control signal DS may be the switch control signal within the data driver 240. For example, when the control signal DS is at the logic level "H", the data line DLk may be electrically connect to the output terminal of the channel amplifier 243, and when the control signal DS is at the logic level "H", the data line DLk may not be electrically connected to the output terminal of the channel amplifier 243.

During t4001 to t4003, the gamma control logic circuit 260 may generate the gamma amplifier bias signal GAMP_BIAS and the gamma decoder control signal GAM_REG such that the plurality of gamma amplifiers 223*a* and 223*b*, . . . , and 223*n* and the plurality of gamma decoders 222*a* and 222*b*, . . . , and 222*n* may operate in the default setting.

At t4001 to t4003, the data driver 240 may generate the data signal based on the plurality of gamma voltages received from the gamma voltage generator 270 operating in the default setting. In addition, since the control signal DS is at the logic level "H", the generated data signal may be output through the data line DLs.

At t4003, the control signal DS may transition from the logic level "H" to the logic level "L".

In addition, at t4003, the gamma control logic circuit 260 may generate the gamma amplifier bias signal GAMP_BIAS such that the plurality of gamma amplifiers 223*a* and 223*b*, . . . , and 223*n* may operate in the down-setting. In addition, the gamma control logic circuit 260 may generate the gamma decoder control signal GAM_REG for operating the plurality of gamma decoders 222*a* and 222*b*, . . . , and 222*n* in the all-zero setting.

During t4003 to t4005, the data driver 240 may generate the data signal based on the plurality of gamma voltages received from the gamma voltage generator 270 operating in the down-setting and the all-zero setting. However, since the control signal DS is at the logic level "L", the generated data signal may not be output through the plurality of data lines DLs.

At t4005, the gamma control logic circuit 260 may generate the gamma amplifier bias signal GAMP_BIAS and the gamma decoder control signal GAM_REG such that the plurality of gamma amplifiers 223*a* and 223*b*, . . . , and 223*n* and the plurality of gamma decoders 222*a* and 222*b*, . . . , and 222*n* may operate in the default setting.

During t4005 to t4007, the data driver 240 may generate the data signal based on the plurality of gamma voltages received from the gamma voltage generator 270 operating in the default setting. However, since the control signal DS is at the logic level "L", the generated data signal may not be output through the data line DL.

At t4007, the horizontal synchronization signal HSYNC may transition from the logic level "H" to the logic level "L". After a preset time, the horizontal synchronization signal HSYNC may transition from the logic level "L" to the logic level "H".

Figure 14:
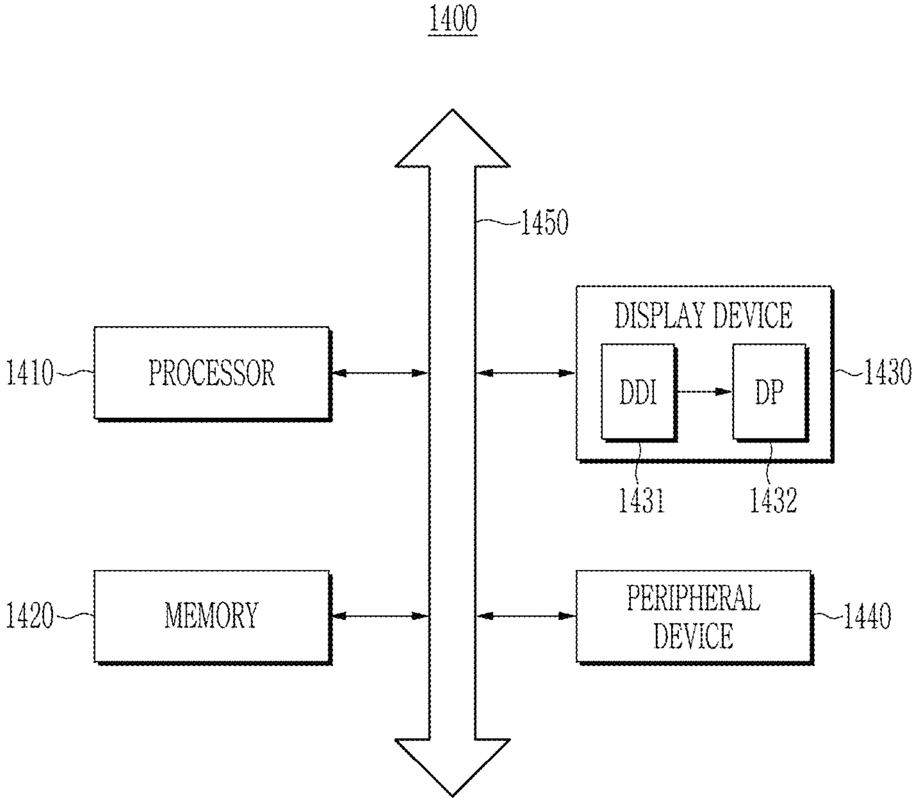
FIG. 14 is a drawing for explaining a semiconductor system according to one or more embodiments.

FIG. 14 is a drawing for explaining a semiconductor system according to one or more embodiments.

Referring to FIG. 14, a semiconductor system 1400 according to one or more embodiments may include a processor 1410, a memory 1420, a display device 1430, and a peripheral device 1440 that are electrically connected to a system bus 1450.

The processor 1410 may control input/output of data of the memory 1420, the display device 1430, and the peripheral device 1440, and may perform image processing of the image data transmitted between corresponding devices.

The display device 1430 may include a display driver IC 1431 and a display panel 1432, and may store the image data applied through the system bus 1450 in the display driver IC 1431 and then display it on the display panel 1432. The display driver IC 1431 may be the display driving circuit described with reference to FIG. 1 to FIG. 13.

The display driver IC 1431 according to one or more embodiments may include a gamma voltage generator including a plurality of gamma decoders, a plurality of gamma amplifiers, and a resistor string. In one or more embodiments, the display driver IC 1431 may inactivate at least a portion of the plurality of gamma amplifiers during the porch section. In one or more embodiments, the display device 1430 may operate in the plurality of modes. The gamma voltage ranges used in respective modes may be preset in the display driver IC 1431. The display driver IC 1431 may detect the minimum gamma voltage used to display the image data based on the test gamma code preset with respect to each of the plurality of modes, and may determine the gamma amplifier to be inactivated. That is, the display driver IC 1431 may detect the gamma amplifier to be inactivated based on the test gamma code preset with respect to each of the plurality of modes. Accordingly, since the number of the gamma amplifiers driven within the display driver IC 1431 decreases, power consumption of the display driver IC 1431 may decrease.

In the porch section, the display driver IC 1431 according to one or more embodiments may decrease the bias voltage applied to the plurality of gamma amplifiers. Accordingly, since the current flowing through the plurality of gamma amplifiers decreases, power consumption of the display driver IC 1431 may decrease.

In the porch section, the display driver IC 1431 according to one or more embodiments may control the plurality of gamma decoders to select the same voltage such that the voltage applied to both ends of the resistor string may be the same. Since the voltages applied to the both ends of the resistor string are the same, current may not flow through the resistor string. Therefore, power consumption of the display driver IC 1431 may decrease.

The peripheral device 1440 may be a device that converts a video or still image into an electrical signal, such as a camera, scanner, or webcam. The image data obtained through the peripheral device 1440 may be stored in the memory 1420, and/or may be displayed on the display panel 1432 in real time.

The memory 1420 may include volatile memory such as dynamic random access memory (DRAM) and/or non-volatile memory such as flash memory. The memory 1420 may be configured as a DRAM, a phase-change random-access memory (PRAM), a magnetic random-access memory (MRAM), a resistive random-access memory (ReRAM), a ferroelectric random-access memory (FRAM), a NOR flash memory, a NAND flash memory, and a fusion flash memory (e.g., a memory in which a static random-access memory (SRAM) buffer, a NAND flash memory, and a NOR interface logic are combined), or the like. The memory 1420 may store image data obtained from the peripheral device 1440 or image signals processed by the processor 1410.

The semiconductor system 1400 may be provided in a mobile electronic product such as a smart phone, but embodiments are not limited thereto, and may be provided in various types of electronic products that display images.

In one or more embodiments, at least one of the components, elements, modules or units (collectively "components" in this paragraph) represented by respective blocks in the drawings including FIGS. 1-4 and 9-11, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While embodiments have been described with reference to the figures, it will be understood by those of ordinary skill in the art that various changes in form and details may be made therein without departing from the spirit and scope as defined by the following claims and their equivalents.

What is claimed is:

1. A display driving circuit, comprising:

at least one processor configured to generate a first gamma code corresponding to a first mode among a plurality of modes;

a gamma voltage generator configured to generate a plurality of gamma voltages with respect to the first mode;

a data driver configured to generate a data signal corresponding to the first gamma code based on the first gamma code and the plurality of gamma voltages, detect a minimum gamma voltage among the plurality of gamma voltages used to generate the data signal based on the data signal, generate first level data corresponding to the minimum gamma voltage, and transfer the first level data; and a gamma control logic circuit configured to receive the first level data and generate a gamma voltage control signal for controlling the gamma voltage generator based on the first level data.

2. The display driving circuit of claim 1, wherein the gamma voltage generator comprises:

a first resistor string configured to generate a plurality of reference gamma voltages by dividing a voltage between a maximum gamma voltage and the minimum gamma voltage;

a plurality of gamma decoders configured to receive corresponding reference gamma voltages among the plurality of reference gamma voltages, select a reference gamma voltage among the corresponding reference gamma voltages based on a plurality of gamma voltage control signals, and output the selected reference gamma voltage;

a plurality of gamma amplifiers configured to receive the selected reference gamma voltage and output a plurality of tab gamma voltages based on the selected reference gamma voltage; and a second resistor string configured to generate the plurality of gamma voltages by dividing the plurality of tab gamma voltages.

3. The display driving circuit of claim 2, wherein the gamma control logic circuit is further configured to determine a plurality of first gamma amplifiers that are driven to generate the minimum gamma voltage among the plurality of gamma amplifiers based on the first level data and a plurality of second gamma amplifiers that are not driven to generate the minimum gamma voltage among the plurality of gamma amplifiers, and generate a first gamma voltage control signal to activate the plurality of first gamma amplifiers and inactivate the plurality of second gamma amplifiers.

4. The display driving circuit of claim 3, wherein the gamma control logic circuit is further configured to generate the first gamma voltage control signal in a porch section, the porch section being an interval between adjacent display periods among a plurality of display periods in which the data signal is output.

5. The display driving circuit of claim 2, wherein the gamma control logic circuit is further configured to generate a gamma amplifier bias signal for applying a first bias voltage to the plurality of gamma amplifiers in a porch section, the porch section being an interval between adjacent display periods among a plurality of display periods in which the data signal is output, and the first bias voltage being lower than a second bias voltage applied to the plurality of gamma amplifiers in the display periods.

6. The display driving circuit of claim 2, wherein the gamma control logic circuit is further configured to generate a gamma decoder control signal for controlling the plurality of gamma decoders to select a first reference gamma voltage among the plurality of reference gamma voltages in a porch section, the porch section being an interval between adjacent display periods among a plurality of display periods in which the data signal is output.

7. The display driving circuit of claim 6, wherein the first reference gamma voltage is a greatest voltage among the plurality of reference gamma voltages.

8. The display driving circuit of claim 1, wherein the data driver comprises:

a decoder configured to select one of the plurality of gamma voltages;

a channel amplifier connected to the decoder, the channel amplifier being configured to generate the data signal by amplifying the selected gamma voltage and output the data signal in horizontal line units; and a switch configured to connect the channel amplifier and a corresponding data line, wherein the switch is configured to be turned off during a porch section, the porch section being an interval between adjacent display periods among a plurality of display periods in which the data signal is output.

9. The display driving circuit of claim 1, wherein the first gamma code is a threshold gamma code configured to distinguish the first mode and a second mode among the plurality of modes.

10. A driving method of a display driving circuit, comprising:

generating a first gamma code corresponding to a first mode among a plurality of modes, in a first section among a porch section, the porch section being an interval between adjacent display periods among a plurality of display periods in which a data signal is output;

generating, by a gamma voltage generator, a plurality of gamma voltages corresponding to the first mode;

generating, by a data driver, a data signal corresponding to the first gamma code based on the first gamma code and the plurality of gamma voltages, and generating first level data corresponding to a minimum gamma voltage among the plurality of gamma voltages based on the data signal; and generating a gamma voltage control signal for controlling the gamma voltage generator based on the first level data in a second section after the first section during the porch section.

11. The driving method of claim 10, wherein the gamma voltage generator comprises:

a first resistor string configured to generate a plurality of reference gamma voltages by dividing a voltage between a maximum gamma voltage and the minimum gamma voltage;

a plurality of gamma decoders configured to receive corresponding reference gamma voltages among the plurality of reference gamma voltages, select a reference gamma voltage among the corresponding reference gamma voltages based on a plurality of gamma voltage control signals, and output the selected reference gamma voltage;

a plurality of gamma amplifiers configured to output a plurality of tab gamma voltages based on the selected reference gamma voltage; and a second resistor string configured to generate the plurality of gamma voltages by dividing the plurality of tab gamma voltages, wherein the generating the gamma voltage control signal comprises:

determining a plurality of first gamma amplifiers that are driven to generate the minimum gamma voltage among the plurality of gamma amplifiers based on the first level data and a plurality of second gamma amplifiers that are not driven to generate the minimum gamma voltage among the plurality of gamma amplifiers; and generating a gamma amplifier control signal to activate the plurality of first gamma amplifiers and inactivate the plurality of second gamma amplifiers based on the first mode.

12. The driving method of claim 11, wherein the generating the gamma voltage control signal comprises generating the gamma amplifier control signal in the porch section.

13. The driving method of claim 11, wherein the generating the gamma voltage control signal comprises generating a gamma amplifier bias signal for applying a first bias voltage to the plurality of gamma amplifiers in the porch section, and wherein the first bias voltage is lower than a second bias voltage applied to the plurality of gamma amplifiers in the display periods.

14. The driving method of claim 11, wherein the generating the gamma voltage control signal comprises generating a gamma decoder control signal that controls the plurality of gamma decoders to select a first reference gamma voltage among the plurality of reference gamma voltages in the porch section.

15. The driving method of claim 14, wherein the first reference gamma voltage is the greatest voltage among the plurality of reference gamma voltages.

16. The driving method of claim 10, wherein the data driver comprise:

a decoder configured to select, a gamma voltage among the plurality of gamma voltages;

a channel amplifier connected to the decoder, the channel amplifier being configured to generate the data signal by amplifying the selected gamma voltage, and output the data signal in horizontal line units through a corresponding data line among a plurality of data lines; and a switch configured to connect the channel amplifier and the corresponding data line, wherein the switch is turned off in the porch section.

17. A display driving circuit, comprising:

at least one processor configured to generate a first gamma code corresponding to a first mode among a plurality of modes, in a first section among a porch section, the porch section being an interval between adjacent display periods among a plurality of display periods in which a data signal is output;

a gamma voltage generator configured to generate a plurality of gamma voltages with respect to the first mode;

a data driver configured to generate the data signal corresponding to the first gamma code based on the first gamma code and the plurality of gamma voltages in the first section, and generate first level data indicating a minimum gamma voltage among the plurality of gamma voltages based on the data signal; and a gamma control logic circuit configured to generate a gamma voltage control signal for controlling the gamma voltage generator based on the first level data in a second section after the first section during the porch section.

18. The display driving circuit of claim 17, wherein the gamma voltage generator comprises:

a first resistor string configured to generate, by dividing voltage between a maximum gamma voltage and the minimum gamma voltage, a plurality of reference gamma voltages;

a plurality of gamma decoders configured to receive corresponding reference gamma voltages among the plurality of reference gamma voltages, select a reference gamma voltage among the corresponding reference gamma voltages based on a plurality of gamma voltage control signals, and output the selected reference gamma voltage;

a plurality of gamma amplifiers configured to output a plurality of tab gamma voltages based on the selected reference gamma voltage; and a second resistor string configured to generate the plurality of gamma voltages by dividing the plurality of tab gamma voltages, wherein the gamma control logic circuit is configured to:

determine a plurality of first gamma amplifiers that are driven to generate the minimum gamma voltage among the plurality of gamma amplifiers based on the first level data and a plurality of second gamma amplifiers that are not driven to generate the minimum gamma voltage among the plurality of gamma amplifiers;

activate the plurality of first gamma amplifiers; and generate a first gamma voltage control signal for inactivating the plurality of second gamma amplifiers.

19. The display driving circuit of claim 17, wherein the gamma control logic circuit is further configured to generate a gamma amplifier bias signal for applying a first bias voltage to a plurality of gamma amplifiers in the porch section, and wherein the first bias voltage is lower than a second bias voltage applied to the plurality of gamma amplifiers in the display periods.

20. The display driving circuit of claim 17, wherein the gamma control logic circuit is further configured to generate a gamma decoder control signal to control a plurality of gamma decoders to select a first reference gamma voltage from among a plurality of reference gamma voltages during the porch section.

* * * * *